United States Patent
Burke et al.

(10) Patent No.: US 10,265,890 B2
(45) Date of Patent: Apr. 23, 2019

(54) METHOD OF MANUFACTURING A THERMOSET POLYMER UTILITY VAULT LID

(71) Applicants: CHANNELL COMMERCIAL CORPORATION, Temecula, CA (US); PRC COMPOSITES, LLC, Ontario, CA (US)

(72) Inventors: Edward J. Burke, Temecula, CA (US); Thomas Atkins, Newport Beach, CA (US); Brian Anthony Beach, Rancho Cucamonga, CA (US); Robert Gwillim, Temecula, CA (US); John A. Neate, Niles, MI (US)

(73) Assignees: Channell Commercial Corporation, Temecula, CA (US); PRC Composites, LLC, Ontario, CA (US)

( * ) Notice: Subject to any disclaimer, the term of this patent is extended or adjusted under 35 U.S.C. 154(b) by 505 days.

(21) Appl. No.: 14/684,257

(22) Filed: Apr. 10, 2015

(65) Prior Publication Data
US 2016/0297113 A1 Oct. 13, 2016

(51) Int. Cl.
*B29K 105/12* (2006.01)
*B32B 27/06* (2006.01)
(Continued)

(52) U.S. Cl.
CPC .............. *B29C 43/02* (2013.01); *B29C 33/10* (2013.01); *B29C 43/38* (2013.01); *B29C 69/00* (2013.01);
(Continued)

(58) Field of Classification Search
None
See application file for complete search history.

(56) References Cited

U.S. PATENT DOCUMENTS 1,765,819 A 6/1930 Apple
3,541,747 A 11/1970 Olson et al.
(Continued)

FOREIGN PATENT DOCUMENTS

BR 102012020655 A2 6/2014
CN 2474594 Y 1/2002
(Continued)

OTHER PUBLICATIONS

PCI, https://www.pcimag.com/articles/83632-uv-inhibitors-in-polyester-gelcoats, Retrieved on Oct. 6, 2017, Published Sep. 1, 2002, pp. 1-10 (Year: 2002).*

(Continued)

*Primary Examiner* — Francisco W Tschen
(74) *Attorney, Agent, or Firm* — Lewis Roca Rothgerber Christie LLP

(57) ABSTRACT

A method of manufacturing a fiber reinforced composite material lid for an utility vault including mixing an unsaturated polyester thermosetting matrix in to a resin paste, compounding the resin paste into a fiber reinforced composite material, maturing the compounded fiber reinforced composite material, cutting the matured compound into a charge pattern, molding the charge pattern in a mold cavity of a heated mold under low pressure to form the lid and cooling and machining the lid. The mold includes a cavity die and a core die having a shear angle for interfacing the core die within the cavity die and a steam pot for heating the cavity die and the core die, wherein the lid is molded between the cavity die and the core die and removed from the mold by a lid ejection mechanism.

14 Claims, 17 Drawing Sheets

(51) Int. Cl.

| | | |
|---|---|---|
| *B29C 43/02* | (2006.01) | |
| *B32B 27/00* | (2006.01) | |
| *B29C 33/10* | (2006.01) | |
| *B29C 43/38* | (2006.01) | |
| *B29C 69/00* | (2006.01) | |
| *B32B 37/24* | (2006.01) | |
| *B32B 38/00* | (2006.01) | |
| *E02D 29/14* | (2006.01) | |
| *B29K 25/00* | (2006.01) | |
| *B29K 67/00* | (2006.01) | |
| *B29K 509/08* | (2006.01) | |
| *B29L 31/10* | (2006.01) | |
| *B29C 43/14* | (2006.01) | |
| *B29C 43/22* | (2006.01) | |
| *B29C 43/46* | (2006.01) | |
| *B32B 37/00* | (2006.01) | |

(52) U.S. Cl.
CPC ............. *B32B 27/00* (2013.01); *B32B 27/06* (2013.01); *B32B 37/24* (2013.01); *B32B 38/0004* (2013.01); *E02D 29/1472* (2013.01); *B29C 43/14* (2013.01); *B29C 43/22* (2013.01); *B29C 43/46* (2013.01); *B29K 2025/06* (2013.01); *B29K 2067/00* (2013.01); *B29K 2105/12* (2013.01); *B29K 2509/08* (2013.01); *B29L 2031/10* (2013.01); *B32B 37/003* (2013.01); *B32B 2262/00* (2013.01); *B32B 2367/00* (2013.01); *B32B 2435/00* (2013.01); *B32B 2439/00* (2013.01)

(56) References Cited

U.S. PATENT DOCUMENTS

| | | | |
|---|---|---|---|
| 4,141,929 A | 2/1979 | Stoops et al. | |
| 4,207,282 A * | 6/1980 | Grisch | B29C 70/00 264/113 |
| 4,302,499 A | 11/1981 | Grisch | |
| 4,515,543 A | 5/1985 | Hammer | |
| 4,927,701 A | 5/1990 | van Gasse | |
| 4,983,247 A * | 1/1991 | Kim | B29C 33/02 156/272.2 |
| 5,471,718 A | 12/1995 | Harrill | |
| 7,381,888 B2 | 6/2008 | Burke et al. | |
| 7,547,051 B2 | 6/2009 | Burke et al. | |
| 8,220,298 B2 | 7/2012 | Burke et al. | |
| 8,708,183 B2 | 4/2014 | Burke | |
| 2001/0053440 A1 | 12/2001 | Colley et al. | |
| 2006/0252869 A1* | 11/2006 | Twardowska-Baxter | C08K 3/34 524/445 |
| 2006/0254794 A1* | 11/2006 | Burke | G02B 6/4451 174/38 |
| 2013/0136537 A1* | 5/2013 | Tonelli | E02D 29/124 404/25 |
| 2014/0144086 A1 | 5/2014 | Stoltenberg | |
| 2014/0148072 A1 | 5/2014 | Nagkura et al. | |

FOREIGN PATENT DOCUMENTS

| | | |
|---|---|---|
| CN | 101871219 A | 10/2010 |
| CN | 102633468 A | 8/2012 |
| CN | 202530476 U | 11/2012 |
| CN | 104250981 | 12/2014 |
| CN | 104404984 A | 3/2015 |
| EP | 0 416 791 A2 | 3/1991 |
| EP | 2 052 836 A1 | 4/2009 |
| EP | 2 546 149 A2 | 1/2013 |
| GB | 2460164 A | 11/2009 |
| JP | 1993(H05)-070675 A | 3/1995 |
| JP | 1995(H05)-027818 U | 5/1995 |
| JP | 1999(H11)-071779 A | 3/1999 |
| JP | 1999(H11)-081361 A | 3/1999 |
| JP | 2009-007464 A | 1/2009 |
| JP | 2011-016278 A | 1/2011 |
| JP | 2012-131190 A | 7/2012 |
| JP | 2013-028332 A | 2/2013 |
| JP | 2014-525852 A | 10/2014 |
| WO | WO 2006/096839 A1 | 9/2006 |
| WO | WO 2012/056381 A1 | 5/2012 |
| WO | WO 2012/154991 A1 | 11/2012 |
| WO | WO2013/009909 A2 | 1/2013 |
| WO | WO 2013/018920 | 2/2013 |

OTHER PUBLICATIONS

MMT, Simplify Mold Design with Robotic Automation, https://www.moldmakingtechnology.com/articles/simplify-mold-design-with-robotic-automation, Retrieved on Oct. 6, 2017; Published on Sep. 1, 2008, pp. 1-6 (Year: 2008).*

Pauer et al., Mold Making and Maintenance, http://compositesmanufacturingmagazine.com/2018/01/best-practices-for-making-and-maintaining-composite-molds/, Published on Jan. 2, 2018, Retrieved on Aug. 30, 2018; pp. 1-3 (Year: 2018).*

Intellectual Property Office of Singapore (IPOS) Written Opinion dated Aug. 7, 2017 in corresponding Singapore Application No. 10201602809W, 5 pages.

Communication with extended European Search Report issued in parallel European Application No. EP 16164511, dated Jan. 3, 2017; 8 pages.

Patent Examination Repor No. 1 issued in parallel Australian Application No. 2016201805, dated Aug. 3, 2016; 6 pages.

"*Handbook of Plastic Processes*"; edited by Charles A. Harper; Wiley & Sons, Inc., 2006; ISBN-13:978-0-471-66255-6, cover pp. 2, 455-463 and 502-505 (9 total).

First Examination Report issued in parallel New Zealand Application 717712 dated May 19, 2016; 6 pages.

Partial European Search Report issued in parallel European Application No. EP 16164511, date of notification Aug. 23, 2016; 7 pages.

Intellectual Property Office of Singapore (IPOS) Search Report for parallel Application No. 10201602809W; search completed Dec. 5, 2016; 4 pages.

Intellectual Property Office of Singapore (IPOS) Written Opinion for parallel Application No. 10201602809W; date of written opinion dated Dec. 8, 2016; 6 pages.

Ukrainian Office action issued in parallel application a 2016 02396 dated Apr. 11, 2017 (2 pages).

Japanese Office action (Reasons for Rejection) issued in parallel application JP 2016-078010 dated Mar. 14, 2017 (3 pages), with English translation (5 pages).

Intellectual Property Office of Singapore (IPOS) Third Written Opinion dated Mar. 1, 2018 in corresponding Singapore Application No. 10201602809W, 6 pages.

First Office action issued in parallel Chinese Application No. 201610214166.2, dated Sep. 26, 2017, 9 pages, along with English Translation.

First Examination Report (Corrected) issued in parallel New Zealand Application 724009 dated Jan. 31, 2018, 3 pages.

Mallick: Composites Engineering Handbook (1997); ISBN 0-8247-9304-8, pp. 493-494, 4 pages.

Third Notice of Reasons for Rejedion issued is parallel Japanese Application No. 2016-078010, dated Mar. 27, 2018, 7 pages, along with English translation.

Formality Examination Report & Search Report issued in parallel Philippine Application No. 1/2018/000089, filed Mar. 27, 2018, 4 pages.

* cited by examiner

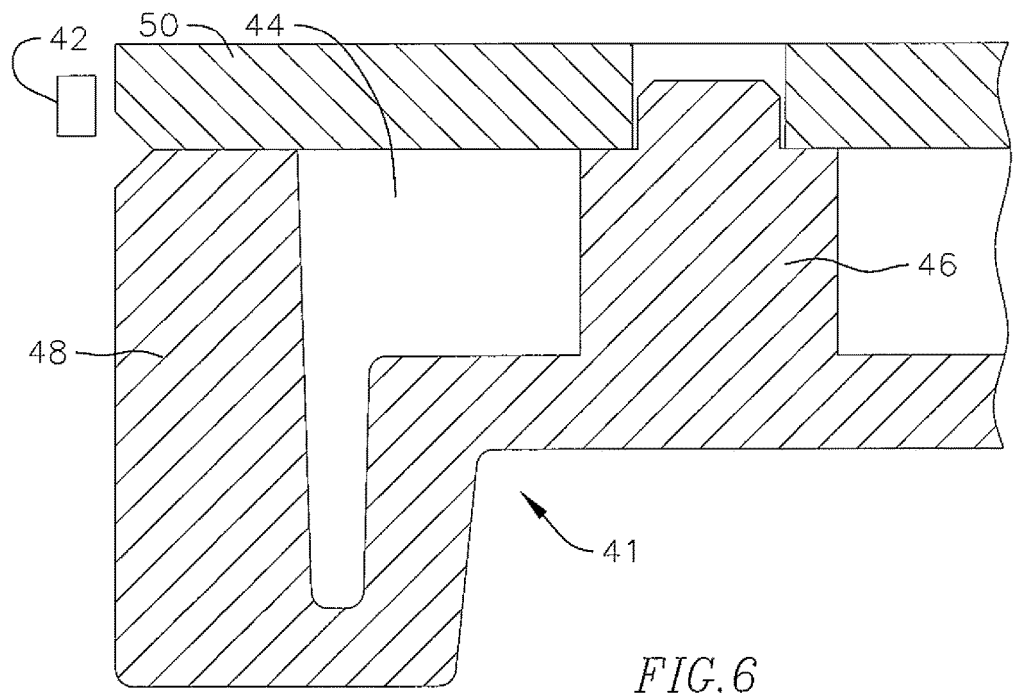
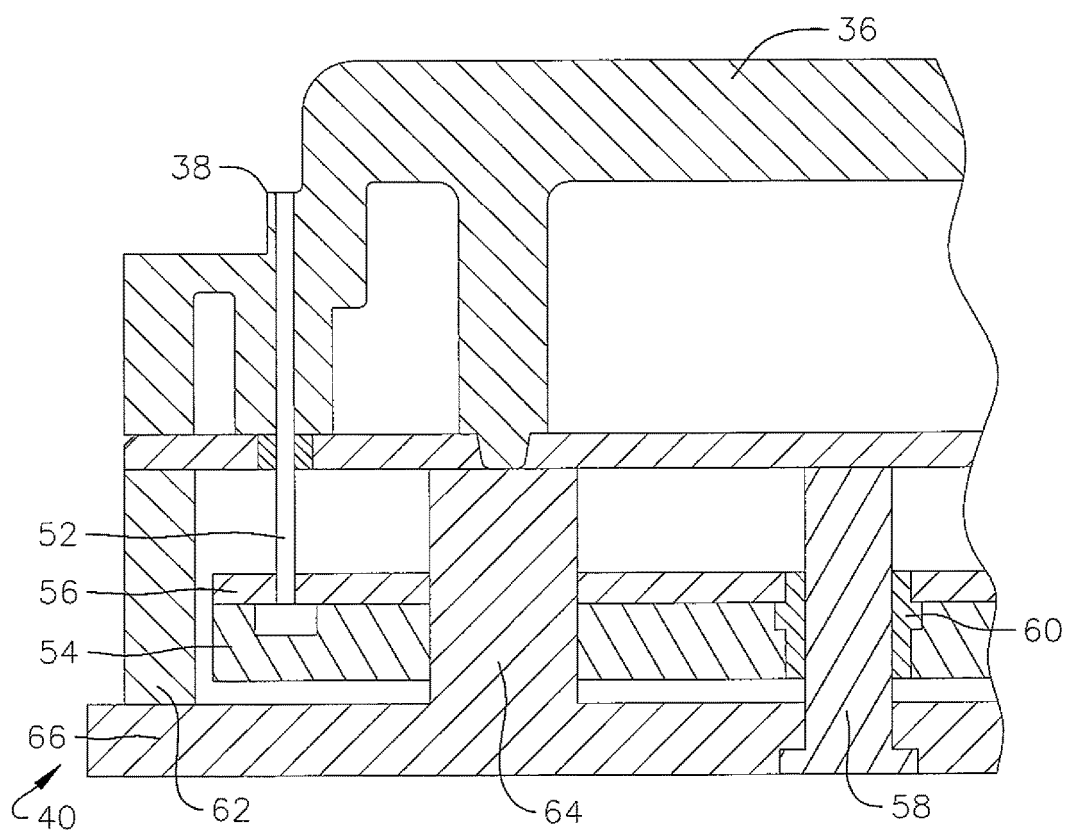

METHOD OF MANUFACTURING A THERMOSET POLYMER UTILITY VAULT LID

FIELD OF THE INVENTION

The invention relates to a thermoset polymer lid or cover and method of manufacturing thereof for an underground or grade level vault used in various underground industries.

BACKGROUND

Underground or buried vaults, pits, chambers or boxes used in the utilities, security and rail line sectors or other industries can contain co-axial or optical fiber, copper cable as well as gas and power lines and other conduits, industrial valves, Wi-Fi antennas etc. Vaults and pits for underground utilities often need to be opened for making repairs or for enhancing services. Typically utility vaults and pits include a concrete, polymer concrete, cast iron, galvanized steel or plastic lid which is opened by a tool or pick with a hook at one end. The hook is inserted through a hole in the lid or cover and is used for prying the lid or cover away from its opening atop the vault or pit.

Because underground utility vaults or pits are often times required to be located in sidewalks, right aways, alley ways and streets or other high traffic areas, the cover must be constructed to withstand substantial loads. Consequently current lid or cover construction is made from concrete, polymer concrete and cast iron in order to withstand the required loads. These cover materials can withstand substantial loads and have a degree of durability required for use in various traffic areas. A drawback of these cover types is that they are quite heavy, weighing in excess of 100 pounds or more depending upon the particular application. Consequently, due to their weight, they are difficult to remove for repair, maintenance or adding additional services within the apparatus contained within the utility vault or pit. Heavy covers can cause injury or other back problems to workers during removal and reinstallation of the covers.

Utility vault and pit covers are also made of plastic but these have limited application for use in areas where they are subjected to less load, i.e. green belt or yard applications. The problem with plastic lids is that because they cannot withstand substantial loads, they have limited applicability and plastic lids provide less coefficient of friction when wet versus polymer covers. Consequently a need exists for a new utility vault and pit cover design which is light in weight, yet is durable in that it can withstand substantial loads and provide improved slip resistance over currently available covers.

SUMMARY OF THE INVENTION

The present invention in an embodiment provides an improved utility vault cover or lid which is manufactured from a fiberglass reinforced polymer matrix material producing a reduced weight and increased strength cover which is lighter, stronger, has improved UV characteristics and slip resistance and is less expensive to manufacture compared to existing cover designs. The lid or cover is used for vaults, pits, chambers or boxes and for ease of presentation shall all be referred to herein as a vault. Vaults are used in a number of industries including utility, security, gas and rail, for example, where they are underground, buried or at grade level.

The fiberglass reinforced polymer matrix (FRPM) material is a fiber reinforced polymer material which consists of an unsaturated polyester thermosetting resin matrix, glass fiber reinforcement and inorganic or mineral filler. Additional ingredients are low-profile additives including a UV inhibitor, cure initiators, thickeners, process additives and mold release agents. The formulation undergoes a cross linking reaction when cured under heat and pressure. The fiber reinforced polymer material for the cover will retain its original material properties and dimensional accuracy over a broad range of temperatures. The cover is on average fifty percent lighter than concrete and polymer concrete covers and sixty-five percent lighter than cast iron lids.

The fiber reinforced polymer material is made as a continuous sheet wherein a resin paste is transferred to a doctor box where it is deposited onto a moving carrier film passing directly beneath. Glass fiber rovings are fed into a rotary cutter above the resin covered carrier film. Chopped fibers are randomly deposited onto the resin paste. A second carrier film is coated with resin paste and is laid resin side down on top of the chopped fibers. The layers are then sent through a series of compaction rollers where the glass fibers are consolidated with the resin paste and the air is removed from the sheet. The fiber reinforced polymer material sheet is kept in a temperature room until the desired molding viscosity is reached.

When the polymer material is ready for molding it is cut into pieces of a predetermined size. The cut pieces are then stacked and assembled into a charge pattern that is the optimum shape and volume to fill a mold cavity. The mold is then closed and the polymer material is compressed. The mold is held closed for a predetermined amount of time to allow the cover to cure. After curing, the mold is opened and the cover is ejected from the lower mold surface with the use of integral ejector pins. The cover is allowed to cool to room temperature before any necessary machining operations. The manufacturing process can be automated through the use of robotics.

The manufacturing process includes low pressure molding in combination with a mold design which incorporates a steam pot to heat the mold, results in lower mold cost, lower material cost and faster cycle times. The mold design allows for low pressure molding which provides faster cycle times resulting in lower production costs while producing a reduced weight and improved performance lid.

The cover consists of an uppermost surface which is flat and in its installed condition on the vault is even with grade. The bottom side of the cover or lid has an outer rim with a recessed interior area or cavity. The cavity includes features to allow for the attachment of accessories and thru-holes as required. The bottom of the lid has continuous support ribs spaced in the cavity to transfer load and minimize deflection under load to the outer rim. The outer rim is supported by the vault, frame or other type of supporting recess. In an embodiment, the ribs are uninterrupted for the span of the cavity to the rim to provide strength to the lid.

The uppermost surface of the cover lid has a texture or a surface condition created by a pattern of features at different depths. The change of depth of the flat surfaces creates a slight protrusion into the surface to push the glass component of the material away from the surface creating a resin rich surface. The top surface also has a series of bosses having shapes of varying heights to allow for aggressive transitions in the surface of the lid. These shapes are arranged in a pattern to allow for additional edge surfaces to grip moving surfaces which may come in contact with the top of the cover. The combination of the UV inhibitor, boss design and surface texturing creates improved UV characteristics and prevents glass fiber blooming. The elevation of the bosses, spacing and angles, along with the texturing of the surface enhances the coefficient of friction of the gripping surface resulting in improved slip resistance.

The cover or lid is designed to allow for installation of either an "L-bolt" or a "thru-bolt" for securing the lid to the vault. Self-latching locking assemblies can also be incorporated. The lid also incorporates features to allow for the installation of a pick hole retaining cup for use in removing the lid from the vault.

These and other features of the present invention will be more fully understood by reference to the following detailed description and the accompanying drawings.

BRIEF DESCRIPTION OF THE DRAWINGS

FIG. 5 is a detail view of the mold of FIG. 3;

FIG. 6 is a detail view of the mold of FIG. 3;

DETAILED DESCRIPTION

Figure 1:
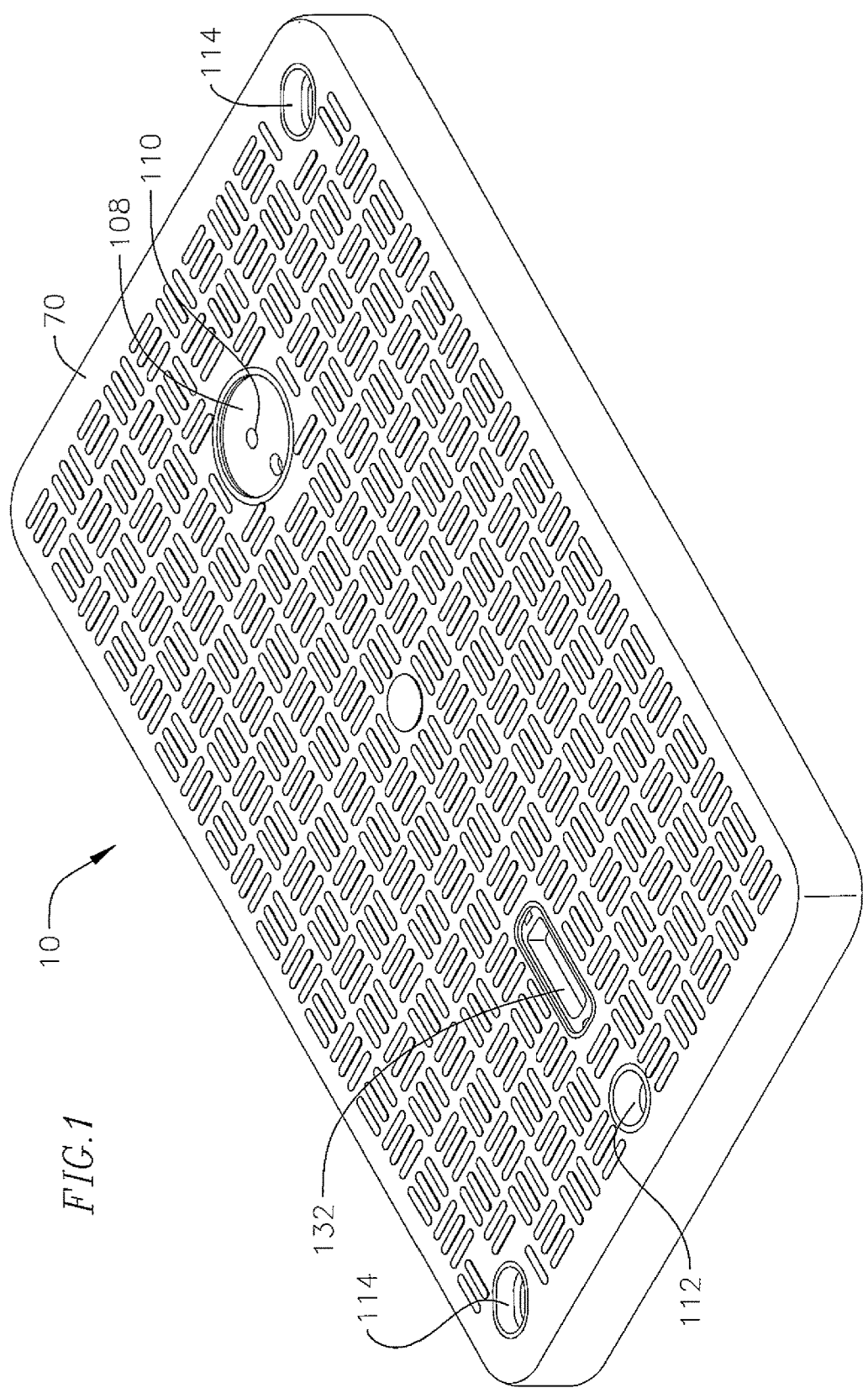
FIG. 1 is a perspective view of an embodiment of a fiber reinforced polymer material utility vault or pit cover or lid of the present invention.

Referring to FIG. 1, an embodiment of the invention is a fiber reinforced polymer material utility vault or pit cover or lid 10 consisting of an unsaturated polyester thermosetting resin matrix, glass fiber reinforcement and inorganic or mineral filler. It is to be understood that the invention is a lid or cover, and these terms are used interchangeably throughout, for a utility vault or pit which are also interchangeable terms used throughout the specification. The matrix further includes a low-profile additive, a cure initiator, a thickener, a process additive and a mold release agent. The additives include a UV inhibitor. The additional components are used to enhance the processability of the material and the performance of the lid. Less than about 30% of the fiberglass reinforced polymer matrix formulation is a petroleum based product comprising unsaturated polyester resin and thermoplastic additives, the remainder is inorganic or mineral filler and reinforcing glass fibers chopped into, for example, one inch lengths. The mineral filler could include, for example, alumina trihydrate, calcium carbonate, talc or clay. The polymer material undergoes a cross linking reaction when cured under heat and pressure. Good heat resistance is a characteristic of all thermoset materials and they differ from thermoplastic material in that once the compound cures into a rigid solid it will not soften at elevated temperatures or become brittle at lower temperatures. The lid retains its original material properties and dimensional accuracy over a broad range of temperatures. UV resistance is optimized through a combination of using orthophthalic resin, polystyrene as the low profile additive for shrink control and alumina trihydrate filler to produce the best results against weathering. A low level of organic material coupled with the use of inorganic fillers, for example alumina trihydrate, results in the material being highly flame retardant. Using the UL Bulletin 94 protocol as a measure, the material performs at the highest possible 5V flammability classification.

Figure 2:
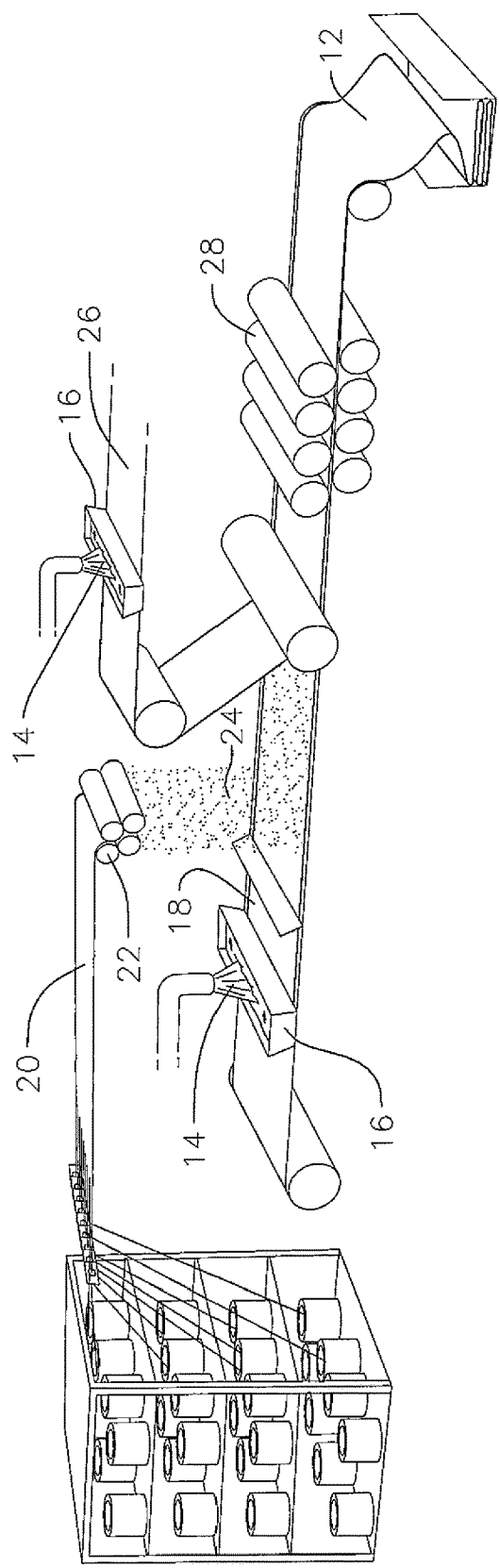
FIG. 2 is a diagram of the compounding process for manufacturing the fiberglass reinforced polymer material.

Referring to FIG. 2, the fiberglass reinforced polymer matrix is manufactured as a continuous sheet 12. Mixed resin paste 14 is transferred to a doctor box 16 wherein it is deposited onto a moving carrier film 18 passing directly beneath the doctor box. The doctor box controls the amount of resin paste that is applied to the carrier film. Glass fiber rovings 20 are fed into a rotary cutter 22 above the resin covered carrier film. Chopped fiberglass fibers 24 are randomly deposited onto the resin paste. The amount of chopped fiberglass that is deposited is controlled by the cutter and the speed of the carrier film. Downstream of the chopping operation, a second carrier film 26 is also coated with resin paste 14 by a second doctor box 16 and is laid resin side down on top of the chopped fibers 24. This process creates a resin paste and glass fiber sandwich which is then sent through a series of compaction rollers 28 wherein the glass fibers are wet out with the resin paste and the air is squeezed out of the sheet 12 to produce a homogenous sheet of fiberglass and resin.

Figure 3:
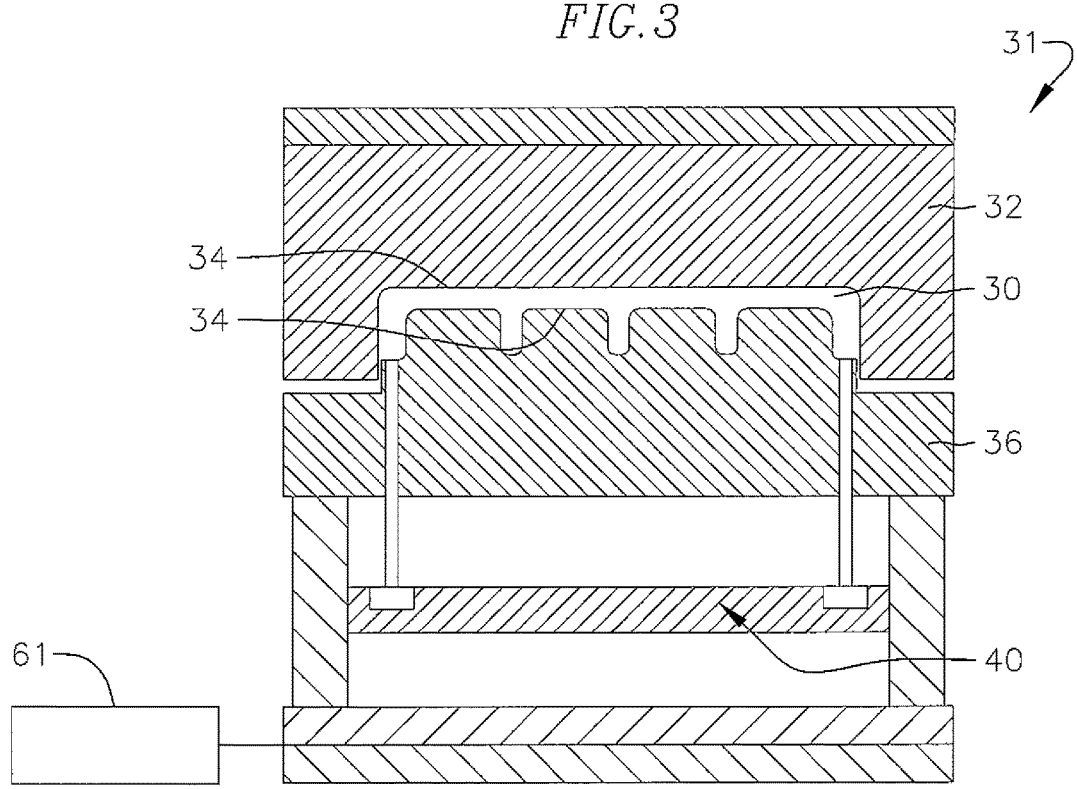
FIG. 3 is a cross-sectional view of the mold for manufacturing the lid.

Before the fiberglass reinforced polymer matrix sheet can be used for molding it must mature. This maturing time is necessary to allow the relatively low viscosity resin to chemically thicken. The sheet is kept in a temperature room until the desired molding viscosity is reached. When the sheet is ready for molding it is cut into pieces of a predetermined size. As shown in FIG. 3 the cut pieces are then stacked and assembled into a charge pattern 30 that is the optimum shape and volume to fill a mold cavity in a mold 31. The charge pattern is then weighed for verification of correct charge weight. The preassembled charge is then placed on heated mold surfaces 34 in a predetermined location. The mold 31 is a matched set of machine steel dies comprising a cavity die 32 and a core die 36. The mold cavity is positioned between the cavity die and the core die.

Figure 4:
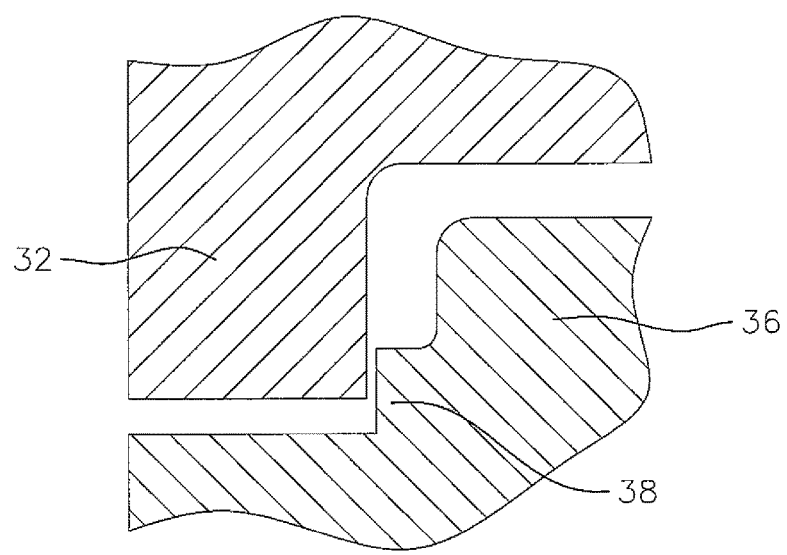
FIG. 4 is a detail view of the mold of FIG. 3.
Figure 7:
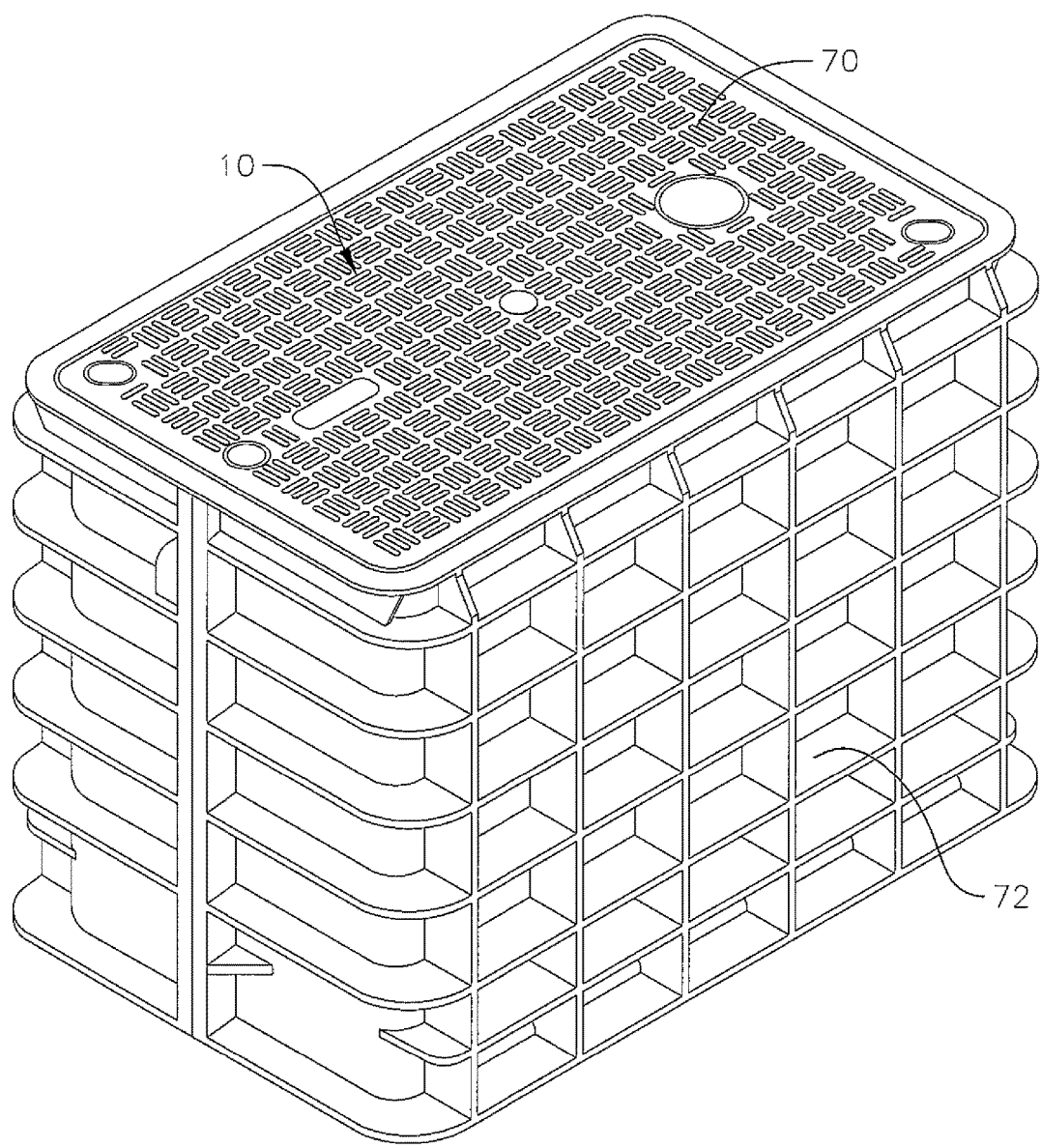
FIG. 7 is a perspective view of the lid positioned on the utility vault.

The mold is heated, for example, by steam. After the charge is placed in the mold cavity, the mold is closed and the charge is compressed. The fiber reinforced polymer matrix material is a flowable compound and under heat and pressure is transformed from a thick paste to a very low and optimized viscosity liquid of viscoelastic state. The material flows to fill the mold cavity. As seen in FIG. 4, the cavity die 32 and the core die 36 are interfaced by a telescoping shear edge 38 which provides for a gap between the core die and the cavity die to allow for the core die to enter the cavity die. The telescoping shear edge allows for the material to be controlled during the molding or compression phase of the process. The clearance at the shear edge allows the escape of air ahead of the material flow front. The small clearance of the shear edge allows air to pass but it is too small to allow an appreciable amount of the polymer material to pass. The mold is held closed for a predetermined amount of time to allow the cover to cure. After curing, the mold is opened and the cover is ejected from the mold surface of the core with the use of integral ejector pins. The hot molded lid is placed into a cooling rack and allowed to cool to room temperature before a machining operation.

Referring again to FIG. 3 the mold 31 includes an ejector system 40 for ejecting the finished molded part. The mold can be made from A-36 tool steel for example, however other materials could also be used. The core die and cavity die are aligned by components in the tool, for instance alignment pins and bushings. Stop pads are utilized to control part thickness. As shown in FIG. 5, the core die and cavity die are provided with a means to control the temperature of the blocks. For example a steam pot 41 can be incorporated. The temperature of the mold is monitored by means of a thermocouple 42. The steam pot is a sealed cavity 44 which has internal supports 46 surrounded by an outer perimeter 48 and sealed with an additional plate 50 to maintain pressure and control the steam. A steam pot is utilized in both the core die and the cavity die and allows steam to be used to provide a consistent and uniform heat transfer to the mold surfaces 34. The surface area of the steam pot cavity allows for increased surface area for transfer as opposed to drilled lines. Other means to control the temperature of the blocks can include drilled holes or slots used with oil or electrical heating elements.

Referring to FIG. 6 the ejector system 40 includes ejector pins 52 utilized to push the molded part off of the core die 36 at the end of the molding process. The ejector system includes an ejector plate 54 which pushes a group of ejector pins that are flush with the top of the core die or the bottom of the part lifted from the core die. The ejector pins 52 are retained on the ejector plate 54 by means of a retainer plate 56 which has counter bored holes to capture the head of the ejector pins. The ejector plate assembly is guided by means of guide pins 58 and bushings 60. The ejector plate is actuated by hydraulic cylinders 61 (FIG. 3) controlled by the molding cycle. Actuation of the ejector plate can be achieved by other means such as chain poles or knockout bars in the apparatus. The ejector plate assembly is supported by rails 62, support pillars 64 and a bottom plate 66. The ejector plate also has a provision for heating the mold with drilled holes for steam.

The top, bottom and sides of the mold assembly can be insulated to contain the heat required for the process. It also insulates the heat from the machine or hydraulic press to manufacture the part.

Example Manufacturing Process for an Embodiment of the Invention

Mixing and Storing

Polymer Formulation

| Ingredients | Desired % | Range |
|---|---|---|
| Polyester Resin | 23.25 | 10-40% |
| Polystyrene (Shrink Control) | 11.46 | 5-30% |
| Catalyst | 0.39 | 0.1-8% |
| Inhibitor (PBQ) | 0.26 | 0.1-8% |
| Fiber Wetting Additive | 0.35 | 0.1-8% |
| Zinc Stearate (Mold Release) | 1.21 | 0.1-8% |

-continued

| Ingredients | Desired % | Range |
|---|---|---|
| Inorganic Filler | 24.99 | 15-50% |
| Magnesium Oxide (Thickener) | 1.21 | 0.1-8% |
| UV Stable Pigment (Gray) | 1.89 | 0.1-10% |
| Fiberglass (0.5"-2" Chopped) | 35.0 | 5-60% |

The polymer formulation is typed into an automated delivery system. This system is responsible for mixing of all of the ingredients together, storing the polymer matrix and then delivering it to a compounder, for example a Schmidt and Heinzmann (S&H) Compounder.

The formulation is mixed to ensure that the material is homogeneous. Controllers manipulate the order of addition, dwell time, blade speed and mixing temperature. Upon completion of paste matrix mixing cycle, several tests are performed to make certain the paste is correct before being released to a holding tank. The holding tank's primary function is storage. During the storing process, the paste matrix is agitated by low shear mixing blades. If the weather is less than 65 F degrees a water blanket is used to make sure that the paste does not lose temperature. This loss can influence the thickening response and negatively impact the moldability of the material. The holding tank is placed on a scale and is continuously metered gravimetrically to the compounder during manufacturing. The polymer matrix still does not have color or the thickener (polymer extender). Both of these ingredients are added separately to ensure that there is not any cross contamination in color or troublesome thickening because of improper maintenance. The "b-stage" component is tested to confirm the desired formulation before it is released into production.

Batch mixing is typically used when formulation flexibility is required. When the lids are manufactured with one formulation, a continuous process can be employed. This allows the mixing process to be tailored to one specific formulation. All of the ingredients are continuously fed to a mixer, typically an extruder. They are blended together in the extruder and introduced into the compounder. This process eliminates the additional equipment needed to feed and mix the b-side.

Matrix and B-Stage Delivery

The automated delivery system will determine pump rates needed for manufacturing. This system will determine the amount of paste delivered per hour to the compounder based on the matrix specific gravity, product weight, glass percent and sheet weight. The matrix and b-side are combined by running through a series of high shear cowls type mixing blades or a static mixer. The mixed material is then stored in a surge tank and delivered to the compounder with stater pumps. Inside of the doctor blades on the compounder are height sensors. The height of the material in the doctor boxes is controlled by the automated delivery system.

Compounding

There are many variable that can be changed on the compounding machine such as:

TABLE 1

| | Preferred Values | Range |
|---|---|---|
| MACHINE | | |
| Belt Speed | 5 m/min | 3-20 m/min |
| Cutter Speed | 167 RPM | 100-668 rpm |
| Feed Roller | 2.5 Bars | 1-5 bar |

TABLE 1-continued

| | Preferred Values | Range |
|---|---|---|
| Rubberroll | 3.5 Bars | 1-5 bar |
| Oscillation | 2.0 Bars | 1-5 bar |
| Winding Counter | 250 | 100-300 rpm |
| Holding Tank Temperature | 95 F. ± 5 F. | 60-120 F. |
| Final Mixer Tank Temperature | 95 F. ± 5 F. | 60-120 F. |
| DOCTOR BOXES | | |
| Lower Dam Height | 0.069" | 0.050"-0.120" |
| Upper Dam Height | 0.069" | 0.050"-0.120" |
| Dam Sides Height | 0.065" | 0.020"-0.100" |
| Level SP #1 | 38 mm | 20-80 mm |
| Level SP #2 | 38 mm | 20-80 mm |
| POLY FILM | | |
| Upper Film Tension | 6.0 Bars | 2-10 bar |
| Lower Film Tension | 6.0 Bars | 2-10 bar |
| Sheet Width | 34½" | 10"-80" |
| Deflector Width | 35⅛" | 8"-82" |
| COMPACTION UNIT | | |
| Belt Tension (Upper) | 4 Bars | 2-10 bar |
| Belt Tension (Lower) | 4 Bars | 2-10 bar |
| Impregnation Bridge Lower Range | 9.5 Bars | 4-12 bar |
| Turret Winder | 4 Bars | 2-8 bar |
| Smoothing Roller Up/Down | UP | up/down |

Since the specific gravity of the material is known, the height of the doctor blades can be determined based on the product weight of the material. The product weight of the compound is measured by the weight per unit area. Typically weight is measured in grams/ft². The fiberglass component can also be measured. Varying the RPMs of the chopper will linearly change with the weight of the fiberglass. The product weight of compound is 545 g/ft.².

Paste samples (matrix and b-side together) are taken throughout the run and measured with a viscosmeter. Typical measurements are taken initially, at 24 hours and at 36-60 hours. Several variables are considered when determining the thickening curve: temperature, initial viscosity and molding viscosity. These values are optimized based off of prior compounding and material trials. When lot number of either the resin or the thickener change, a thickening study is run to determine if the levels need to be changed. The target molding viscosity of the material is between 20-45 MM cps. Viscosity measurements are taken with a Brookfield DV-II.

After the polymer matrix is introduced to the fiberglass the sheet is then squeezed together between serpentine rollers to wet-out the fiberglass. Since this process yields structural parts, a ft² template is used to cut a sample of the material. If it falls within a predetermined range, the material is qualified for release.

The product weight samples are collected and used to mold lab panels. During the molding a sensor detects the dielectric properties of the material and determines the gel and cure time of the material. The cured panels are then cut up into various samples for testing. Typical testing includes tensile strength, flexural strength, specific gravity, fiberglass content and water absorption.

TABLE 2

Physical properties measured on 0.120" thick panel molded 24 Hrs. after manufacture. Molding Conditions: 3 min. at 330° F. Molding Pressure = 200 psi. Coverage = 60%

| Property (units) | Desired Range |
|---|---|
| Gel Time (s) | 35-50 |
| Cure Time (s) | 87-105 |
| Product Weight (g/ft²) | 534-556 |
| Specific Gravity (g · cm⁻³) | 1.63-1.67 |
| D3 to D5 Viscosity (Cps) | 23-35 |
| Tensile Strength (psi) | 15,700-18,300 |
| Flexural Strength (psi) | 26,000-31,500 |

Once the material has reached the predetermined values of the quality testing, the material is released into production.

Molding Process

FRPM

The fiber reinforced polymer matrix (FRPM) Compound is delivered to a self aligning actuating mold (SAAM) area on roller carts that hold (8) rolls of compound weighing approximately 200-500 lbs. each, or in a box with 500-6000 lbs.

Each roll has a tag that identifies Manufacture Date, Formulation, Batch #, Roll# and Weight. Material is not released until it has passed all QC requirements as detailed in the Compounding section.

The carts are staged at the FRPM Cutting area where the automated slitter is located.

The SAAM Production Molding Operation Notebook is referenced which shows the charge size and weight for the particular lid that is to be molded.

Once the sheet is located the correct cut sheet and the slitter is set to automatically cut the charge to size and de-film the compound.

The cut charge sheets are then weighed to the correct charge weight and stacked in completed individual charge packs ready to manufacture.

SAAM PRESS

A SAAM system enables large platen area presses to be designed & installed without the need of installation pits. Other press types are also applicable.

The use of a self aligning press was accomplished by inverting the hydraulic cylinders that supply the pressing tonnage.

The use of a self aligning press also allows for any change in location of the press, to meet any change in production demands, to be carried out with a minimum of disruption to the production facility.

To support the SAAM production molding system a special Low Pressure Molding Compound (LPMC) was developed and FRPM (Fiber Reinforced Polymer Material) is a form of LPMC.

The Platen SAAM system allows for the interchange of steel tools (molds) in the normal way.

The tools at present are as follows:

15" round (1400)
13"×24" lid mold (1324)
17"×30" lid mold (1730)
24"×36" lid mold (2436)
24"×48" lid mold (2448)
Split 30"×48" lid mold (3048)
Typical SAAM Operating Pressures: 3,000 psi
Cylinder bore: 12 inch
Rod diameter: 5.5 inch
Effective area of cylinder: 89.34 square inches At 3,000 psi hydraulic pressure the cylinder develops 268,017 lbs. of force Therefore, four (4) cylinders develop 1,072,068 total lbs./536 tons of force A 17"×30" lid has a plan view surface area of 17"×30": 510 square inches 1,072,068 lbs. of force divided by 510 square inches equals 2,102 psi molding pressure A 24"×36" lid has a plan view surface area of 24"×36": 864 square inches 1,072,068 lbs. of force divided by 864 square inches equals 1,241 psi molding pressure A 24"×30" lid has a plan view surface area of 24"×30": 720 square inches 1,072,068 lbs. of force divided by 720 square inches equals 1,489 psi molding pressure.

The molding pressures get halved when molding two-up in the same SAAM.

The plan view surface area is smaller than the total surface area so when using the plan view area around 400 psi molding pressure is utilized.

Molding Procedures

The press is preheated to ensure the proper settings.

A notebook of Master Control Settings is consulted for the sheet for the particular lid to be molded and screens 1 and 2 are set to the proper Control Settings. This Master Control Settings Record Sheet shows proper setting for each of the following:

|  | Value | Range |
|---|---|---|
| SCREEN 1 |  |  |
| 1. Open Position | 52" | 42"-60" |
| 2. Load Position | 42" | 35"-52" |
| 3. Slow Down Position | 34" | 33"-35" |
| 4. Closed Position | 31.5" | 32"-25" |
| 5. Cure Time | 400 sec. | 150-600 sec. |
| 6. Fast Speed | 0.8 IPS | 0.1-1.0 IPS |
| 7. Slow Speed | 0.2 IPS | 0.1-1.0 IPS |
| SCREEN 2 |  |  |
| 1. Top Poppet Auto Time | 50 sec. | 0-100 sec. |
| 2. Bottom Poppet Auto Time | 50 sec. | 0-100 sec. |
| 3. Top Poppet Manual Time | 10 sec. | 0-100 sec. |
| 4. Bottom Poppet Manual Time | 15 sec. | 0-100 sec. |
| 5. Ejection Time | 25 sec. | 0-100 sec. |
| 6. Maximum Slow Cure Time | 99 sec. | 0-100 sec. |

The operator reviews the temperature indicators on the master Control panel to see if the molds are up to the proper temperatures, 325° F.-270° F. for upper tools and 320° F.-265° F. for lower tools.

Once the screens are checked the operator take a hand held temperature gauge and verifies that the mold temperatures match the screen readings from the thermocouples. He is also verifying that the upper mold is always hotter than the lower mold to avert any telescoping shear edge mold crash.

Once the temperatures are verified the operator then visually inspects the mold surfaces for cleanliness and any sign of debris or scumming. If any is seen it is removed with brass tools and air streams.

The press is then set into Automatic mode and readied for the molding of the first part.

Molding Operation

The delivered charges are inspected and measured to ensure they are the correct size and weight. The first charge is staged on the scale and the weight is noted.

On the PROCESS DATA &PARAMETERS MASTER CONTROL SETTINGS RECORD SHEET there is a heading "CHARGE DIMENSIONS". Under this headings are the following line items that contain the proper information regarding the charge for example, a 17×30 (1730) charge:

|  | Value | Range |
|---|---|---|
| 1. Weight LBS.: | 26.1 lb | 26.1-26.6 lbs |
| 2. DIMENSIONS: | 28.5" × 16" | 16"-30" × 8"-17" |
| 3. NUMBER OF LAYERS: | 8 | 5-15 |

Once the charge has been confirmed to meet specification, the green "CYCLE START" button is pushed to activate the automatic molding cycle and the mold lowers to LOAD POSITION.

Once the mold stops to the load position, the charge is delivered into the mold via a loading device and the charge is precisely position on the lower mold being centered in each direction.

As soon as the loading tool has exited the mold parameters, the operator again pushes the green "CYCLE START" button and the press lowers from "SLOW DOWN POSITION" to "CLOSED POSITION". Once the presses sensors confirm that each corner is at Full Closed position, the "CURE TIME" cycle starts.

As the automated cycle starts the operator inspects and places the next charge onto the scale again verifying the weight.

After the CURE TIME cycle is completed, the air poppet is automatically activated and the press opens to SLOW SPEED position and then opens to FAST SPEED and returns to the OPEN POSITION setting of the cycle.

As the press is opening to OPEN POSITION and the mold has cleared the full extension dimension of the ejector pins and reaches a preset clearance height, the ejector system is activated and the part is raised above the lower mold surface to the full height of the ejection pins.

As soon as the ejectors have reached full height, the Unload Tool is inserted under the part and the ejector rods are automatically lowered.

Once the ejectors are back in full rest position, the Unload Tools is extended to the front of the press and the part is delivered to the operator to do a visual inspection, deflash the edges and place in the cooling cart.

Once the part and the Unloading Tool have been removed from the press parameters, the operator visually inspects the mold surfaces and clears and debris with an air stream. The cycle begins all over repeating each of the documented steps.

Machining

Each Cooling Cart handles multiple parts. As the carts are filled they are removed from the SAAM area and placed in a staging area to cool and stabilize. During this period the parts are randomly inspected by QC and verified to meet quality specifications dimensionally, weight and appearance.

The parts need to cool to less than 150° F. prior to any machining being done to the part. This cooling process ensures the dimensional stability and flatness of the part prior to machining.

The machining operator will go through the start-up checklist contained in the computer numerical controlled (CNC) Operations manual and once the checklist is complete he will set the machine to the appropriate machining program corresponding to the sized lids being machining.

The CNC has been programmed to machine one part at a time. Each lid has its own program.

The operator removes a part from a cooling cart and places it in the designated position for the machining cycle.

Once the part is positioned the operator will activate the vacuum holding the part in proper position. The Operator pushes the Green Cycle Start button and the CNC verifies that the vacuum is activated and then moves from the center home position to verify the part is in proper position, once verified by the machine, it will automatically start machining the part on the outboard end of the CNC bed.

As this machining is done the operator will position the next part into its position on the Inboard end of the CNC bed.

Once the machining is complete the CNC will return to the Center Rest position and release the vacuum on the completed part. The operator will again activate the vacuum on the next part and then push the green Cycle Start button.

During machining the operator will remove the previously machined part, do a visual inspection, wiped down, blow off and place on a pallet for shipping for final assembly.

Figure 8:
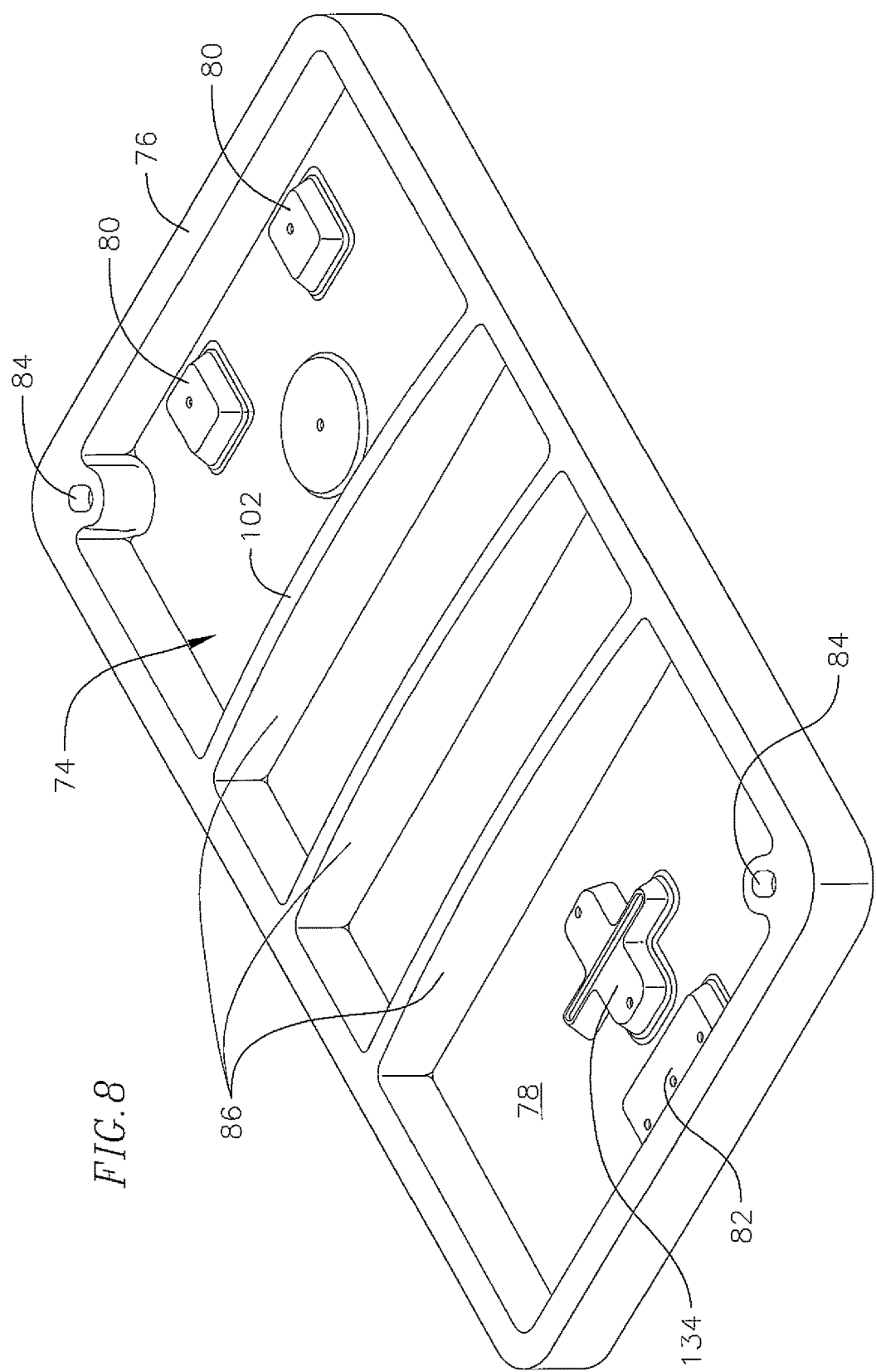
FIG. 8 is a perspective view of the bottom surface of the lid.
Figure 9:
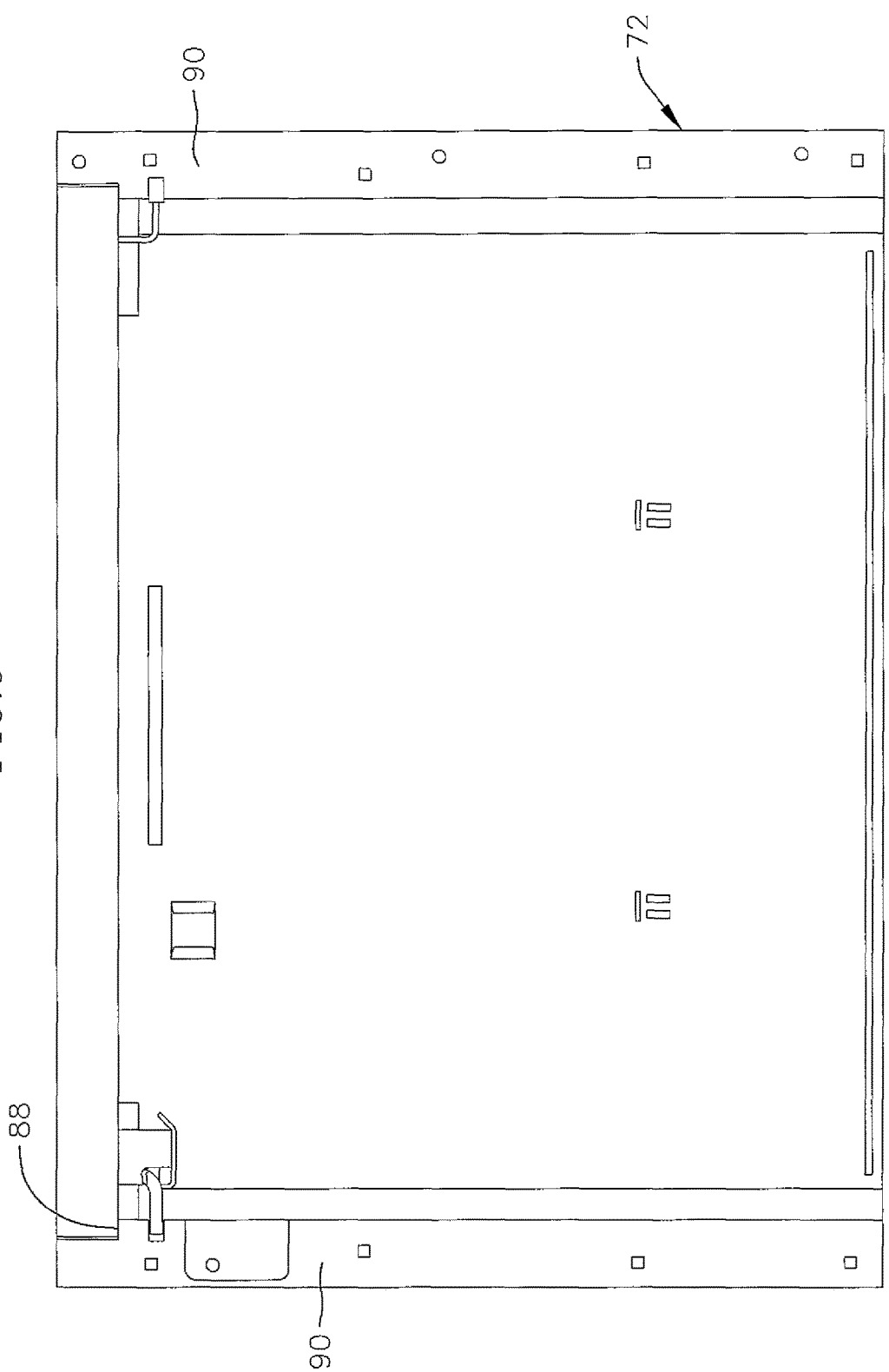
FIG. 9 is a cross-sectional side view of FIG. 7.

Referring again FIG. 1, the lid or cover 10 includes an uppermost surface 70 which is substantially flat and when installed on a vault or pit 72 is even with grade level surface. As shown in FIG. 8, the bottom side 74 has an outer rim 76 around the perimeter of the lid with a recessed interior area or cavity 78. The cavity has features 80 and 82 to allow for the attachment of accessories to be discussed in more detail subsequently herein and thru-holes 84 for attachment to the vault 72. A plurality of continuous support ribs 86 extend from opposite sides of the outer rim within the cavity. The support ribs are spaced to transfer load and minimize deflection of the lid under load to the outer rim. As shown in FIG. 9 the outer rim is supported by a ledge 88 in the outer walls 90 of the vault 72. Although the lid is shown as being supported by a ledge 88 in the walls of the vault, other types of supporting recesses of the vault are contemplated to support the lid.

Figure 10:
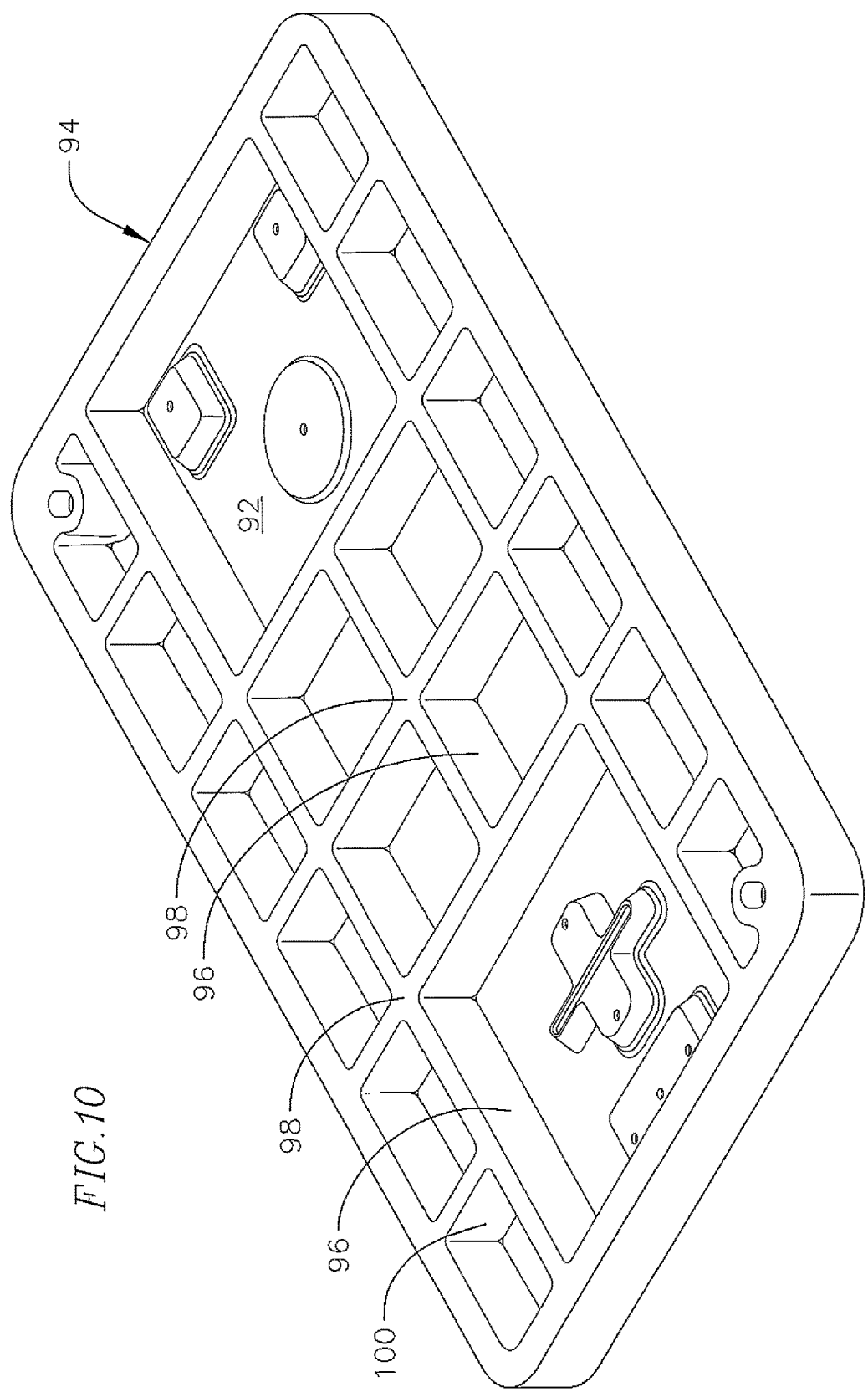
FIG. 10 is a perspective view of an alternative bottom view lid design.

The ribs 86, for example three, extend uninterrupted laterally to span the cavity between opposite sides of the perimeter of the rim. As shown in FIG. 10 alternative designs were tested to determine the effect of additional supporting structures within the cavity 92 of the lid 94. The ribs 86 (as shown in FIG. 8) were superior to alternative designs which incorporates intersecting ribs 96 extending the length or portions of the cavity. The lid of FIG. 10 also incorporated intersecting hubs 98 and it was shown through testing that ribs 86 alone improve the load carrying capability and therefore intersecting ribs 96 and hubs 98 are unnecessary. The test results as shown in Table 3 illustrate the lid design as shown in FIG. 8 comprising a polymer material as disclosed herein produced a larger load carrying capability when the intersecting ribs 96, hubs 98 and small ribs 100 were removed.

TABLE 3

| Version | Nominal Load to First Structural Defect Pounds Force | Nominal Load Failure Pounds Force |
| --- | --- | --- |
| 1730 with Intersecting Ribs | 22,000 | 29,000 |
| 1730 with Laterally Uninterrupted Ribs | 30,000 | 31,000 |
| 1730 with Laterally Uninterrupted Added Depth Ribs | 33,700 | 39,000 |

Figure 11:
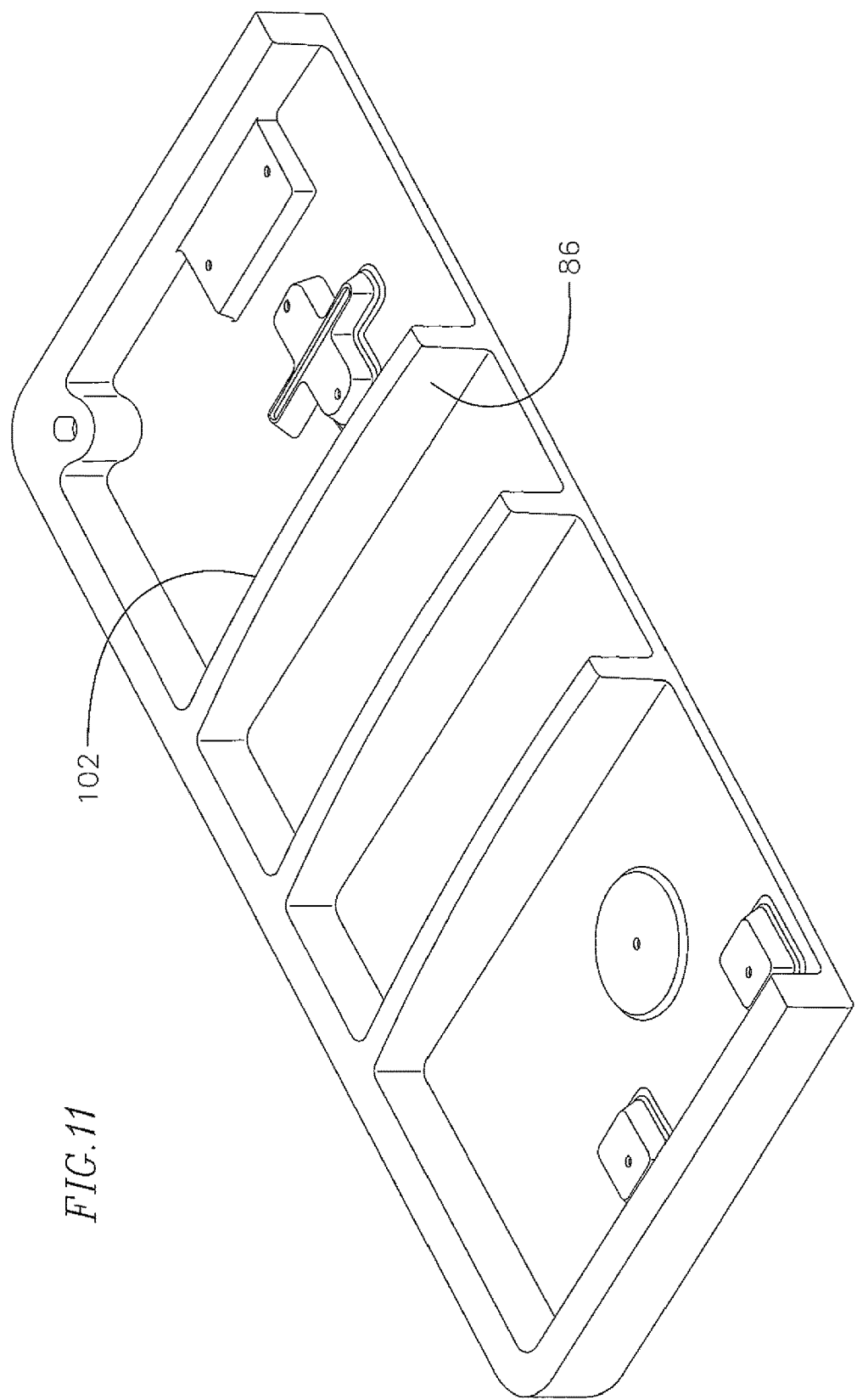
FIG. 11 is a cross-sectional view of FIG. 8.

In addition deeper ribs 86 as shown in FIG. 11 produced the largest load carrying capability. Ribs 86 also can have a curved outer radius 102 allowing the rib to have a height in the center taller than at the juncture with the outer rim.

Figure 12:
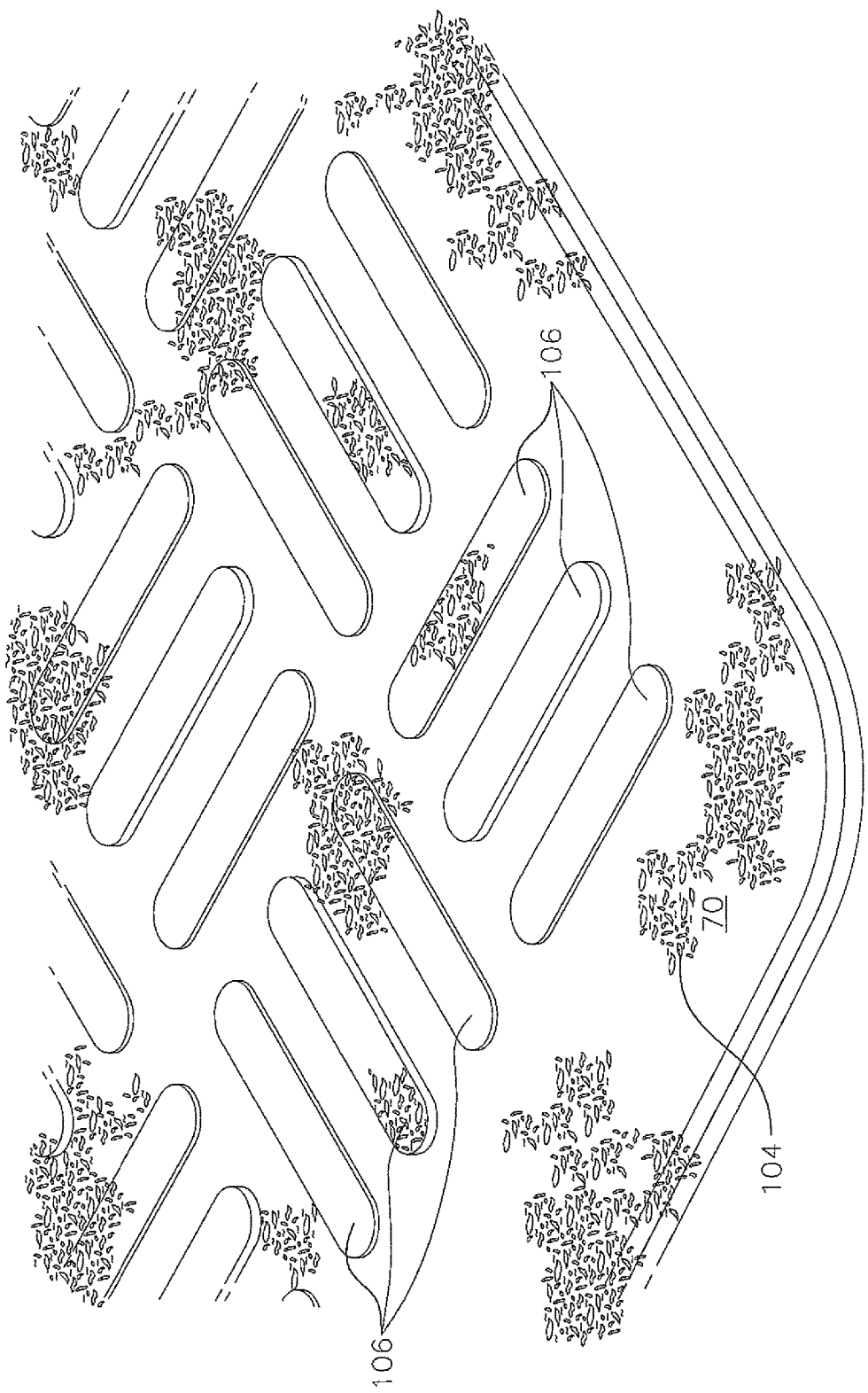
FIG. 12 is a detail view of the upper surface of the lid.
Figure 13:
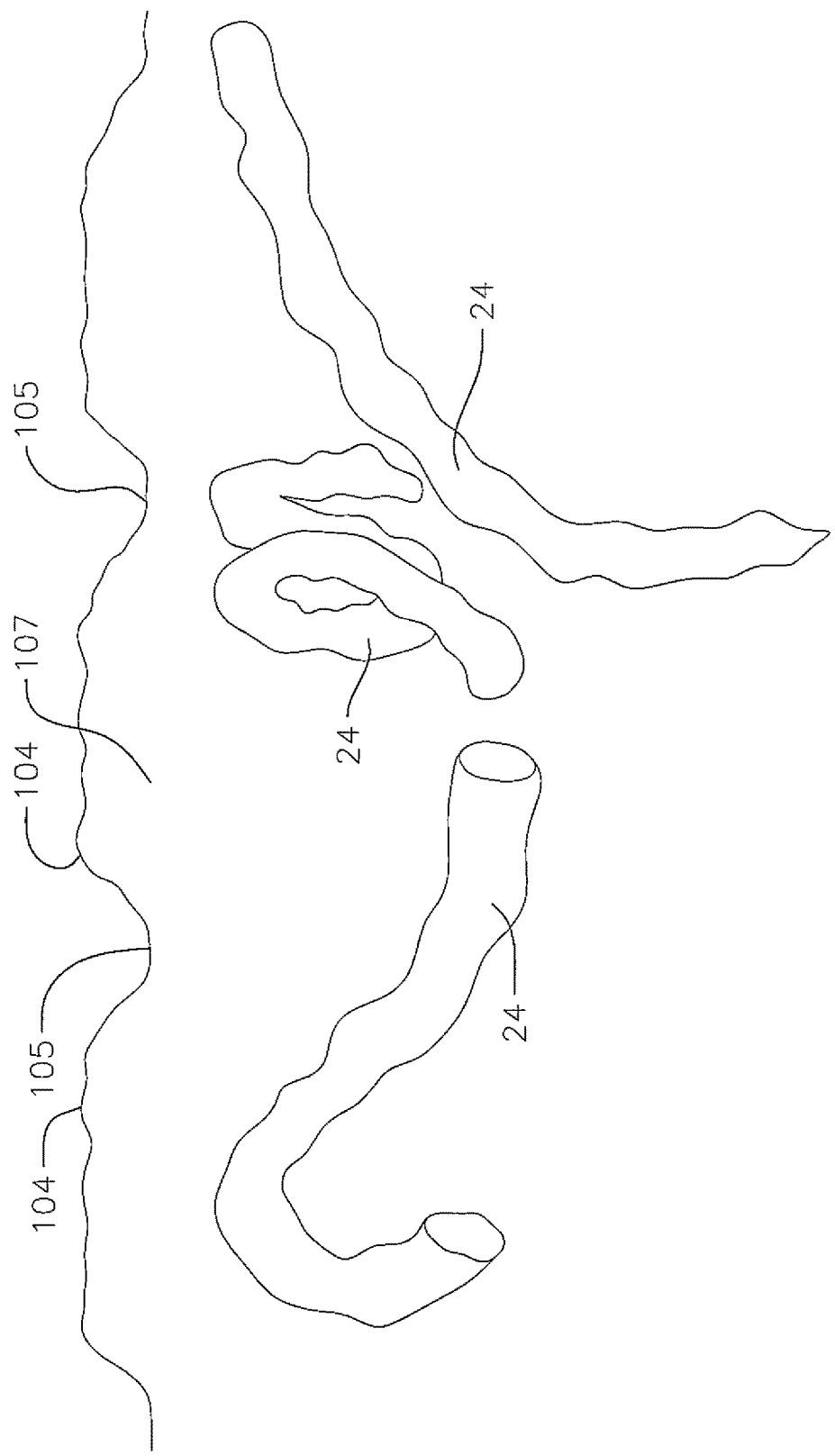
FIG. 13 is a cross-section detail of the surface of the lid of FIG. 12.

As shown in FIGS. 12 and 13, the top surface 70 includes a textured surface 104 or surface condition created by a pattern of features at different depths in the mold surface. The textured surface 104 includes a change of depth of the flat surface which creates a slight protrusion 105 into the surface to push the glass fibers 24 of the material away from the surface creating a resin rich surface 107 during molding. Having the glass fibers 24 away from the textured surface adds to the long term weatherability of the lid. The textured surface is, for example, a Corinthian texture. The combination of the texture and the UV stability achieves a delta E values of less than 9.0 when exposed for 5000 hours using the SAE J2527 test.

Figure 14:
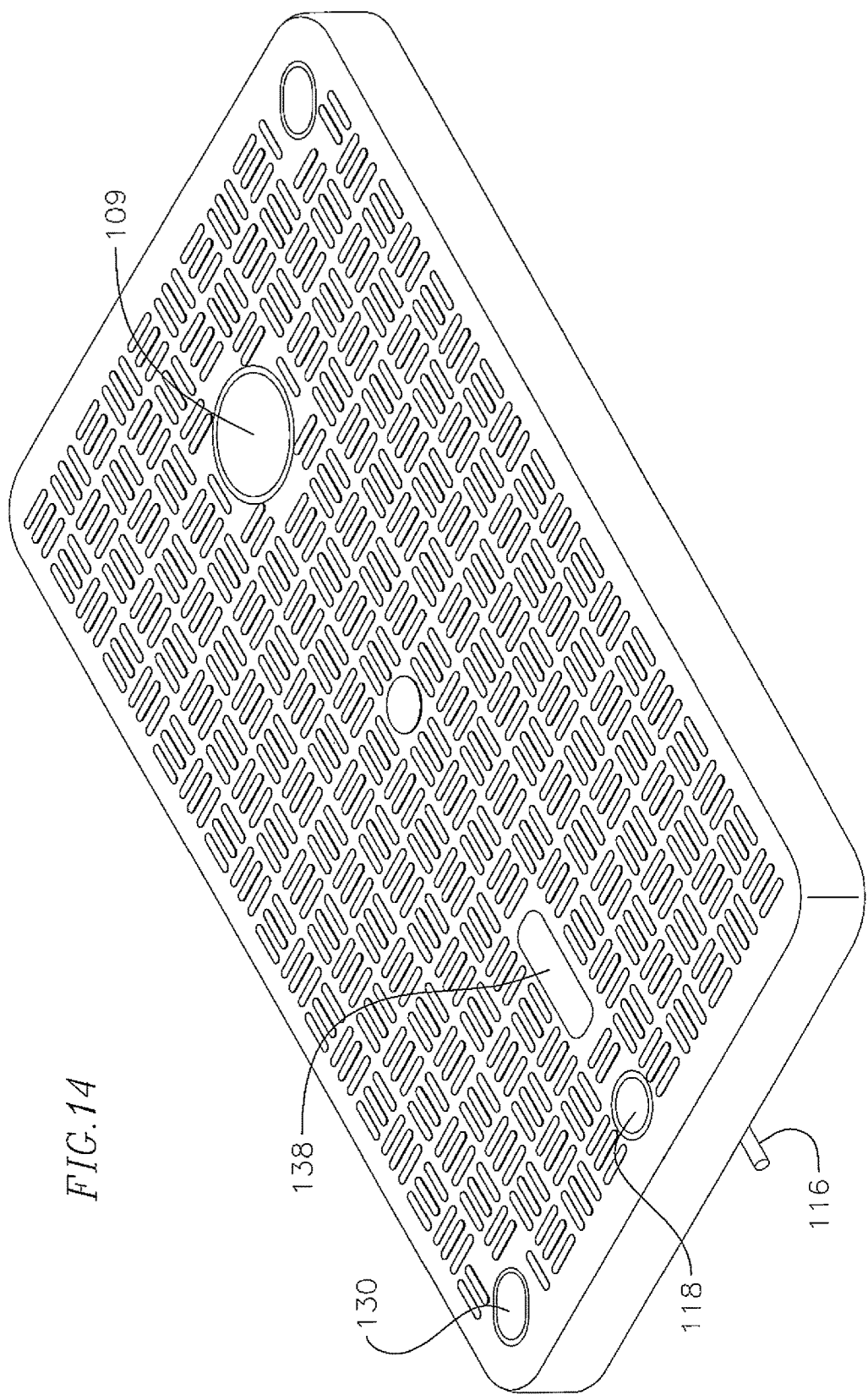
FIG. 14 is a perspective view of the lid.

The top surface 70 also includes a series of bosses 106 of varying heights to create a gripping surface. The bosses 106 are molded at various heights to allow for aggressive transitions in the surface of the lid. The bosses are arranged in a pattern of alternating groups which allows for additional edge surfaces to grip moving surfaces, such as vehicle tires, which may come in contact with the top of the lid. The bosses create more surface area for flexible materials to come in contact with. The result of the bosses is the surface allows the lid to meet slip resistance requirements. Although FIG. 12 illustrates a boss pattern of alternating series of three bars having rounded ends, it is to be understood that other geometrical shapes and sizes and arrangements are possible to create the necessary tread pattern or slip resistance surfaces. Other testing requirements the lid of the present invention meets are as follows:

Polymer lid Related Specifications:
The lid is tested to industry recognized standards for:
Chemical Resistance Per: Telcordia R3-14 and ASTM D543-06
Ultra Violet Exposure Per: ASTM G154
Fungus Resistance Per: ASTM G21
Flammability Per: UL 94-5 VA and ASTM D635-06
Water Absorption Per: ASTM D570-05
The lid is tested to industry recognized standards for:
AS 4586: 2013 Slip resistance classification of new pedestrian surface materials—Appendix A.
ANSI/SCTE 77-2010 Specification for Underground Enclosure Integrity, SCTE, 2010
GR-902-CORE, Generic Requirements for Handholes and Other Below-Ground Splice Vaults, Telcordia, 2013
ASTM C857-11, Standard Practice for Minimum Structural Design Loading For Underground Precast Concrete Utility Structures, ASTM, 2011
AS 3996 2006, Access Covers and Grates
BS EN 124:1994 Incorporating Amendment No. 1 Gully Tops and manhole tops for vehicular and pedestrian areas—Design requirements, type testing, marking, quality control As shown in FIG. 1 the top surface 70 has a recess 108 for the attachment of an identifying component 109 such as an ownership marker as shown in FIG. 14. The ownership marker would have a post extending into hole 110. The identifying marker could be removed and exchanged in case of change of ownership of the lid.

Figure 15:
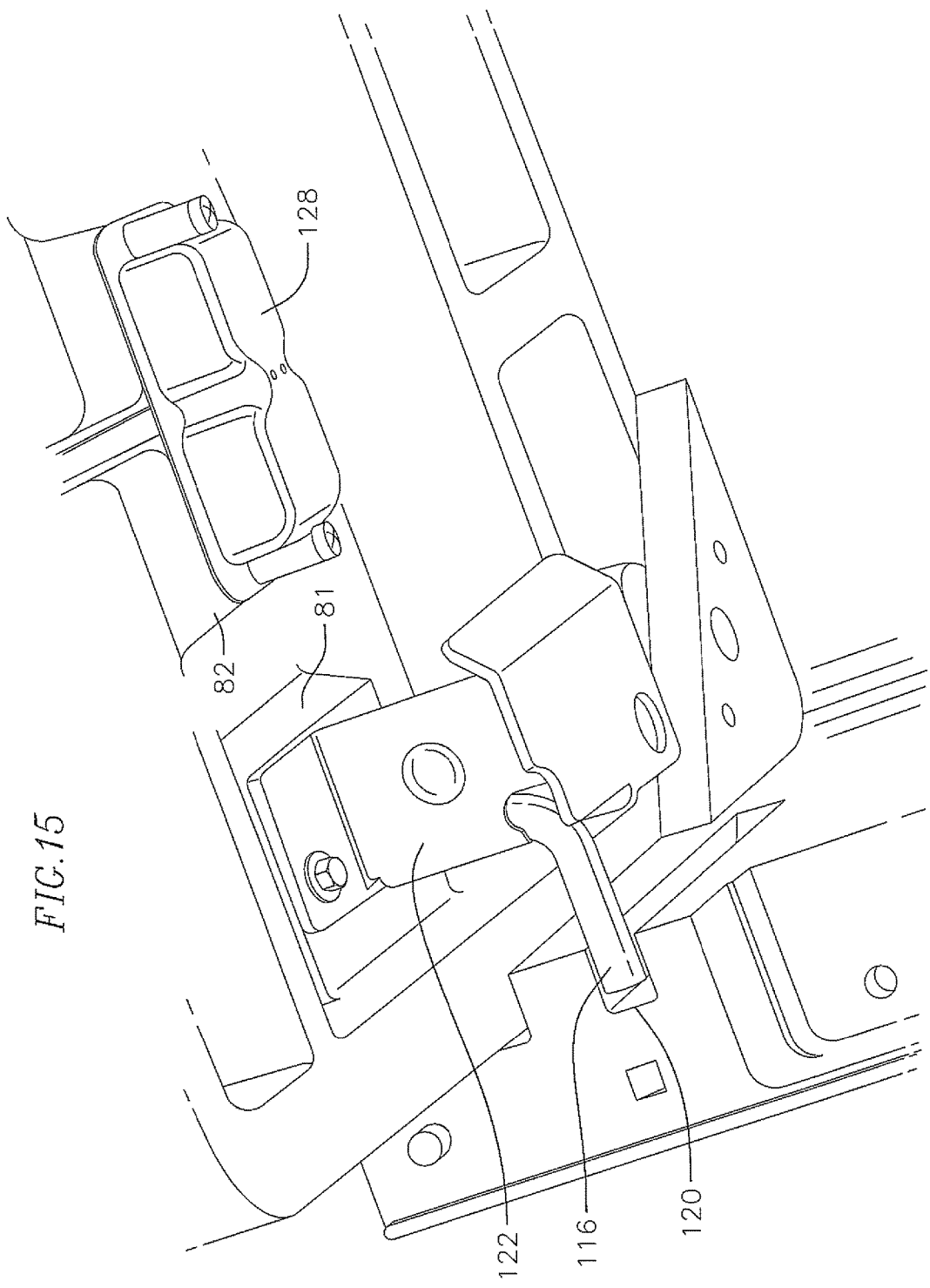
FIG. 15 is a detail view of an L-bolt attachment for the lid.
Figure 16:
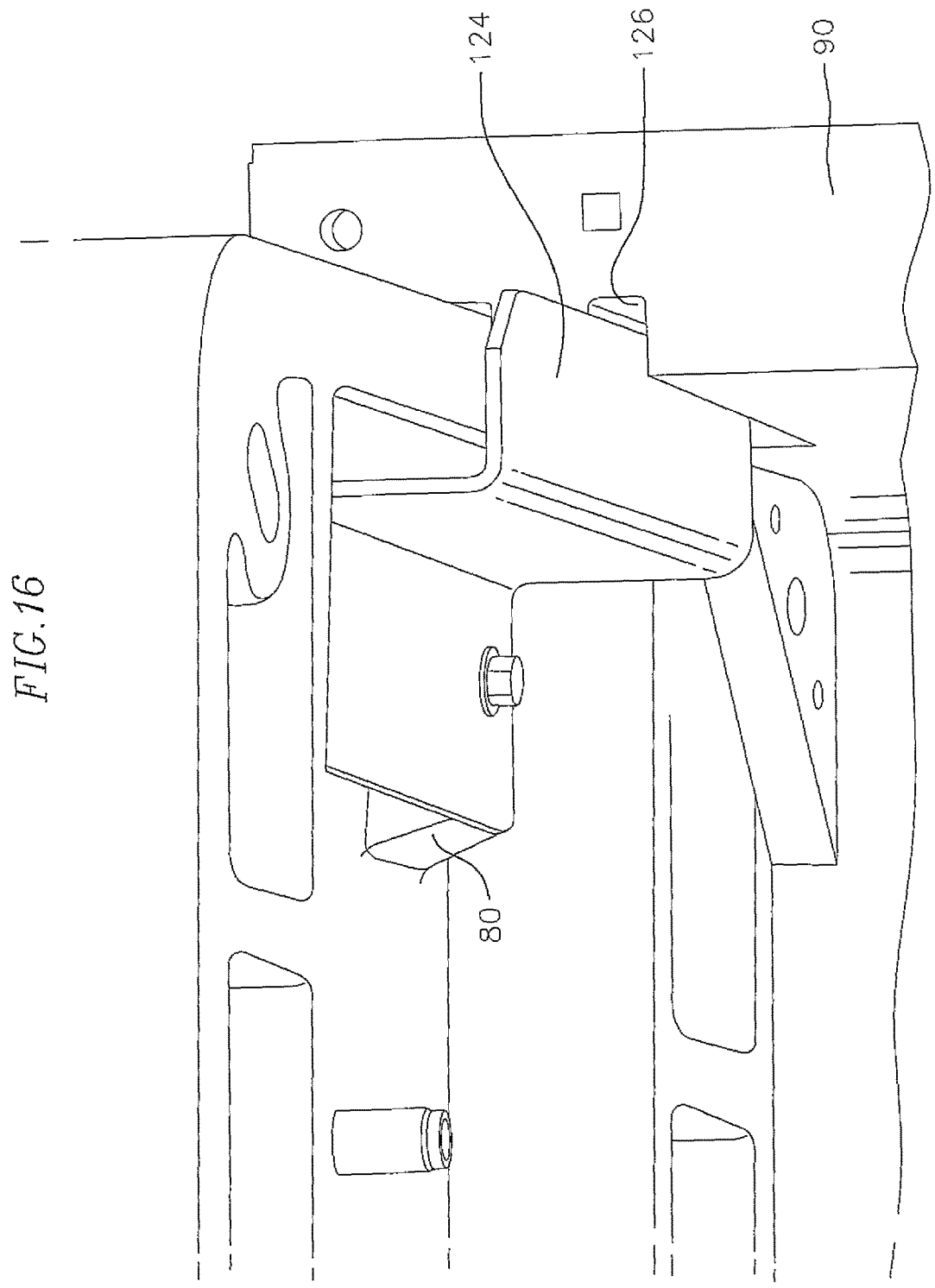
FIG. 16 is a detail view of the flange for attachment of the lid.

Referring again to FIG. 1 the lid includes holes 112 and 114 extending through the lid to allow for either bolt down or captive locking options to attach the lid to the vault. As shown in FIG. 14 either an L-bolt 116, or alternatively a thru-bolt 118 passes through either hole 112 or 114 and would be rotated to engage a groove 120 positioned in the wall 90 of the vault as shown in FIG. 15. The L-bolt 116 is retained within a housing 122 attached to fastening feature 82 positioned on the bottom side of the lid. As shown in FIG. 16, a flange 124 would be attached to fastening surfaces 80 which would engage a groove 126 in the wall 90 of the vault.

Figure 17:
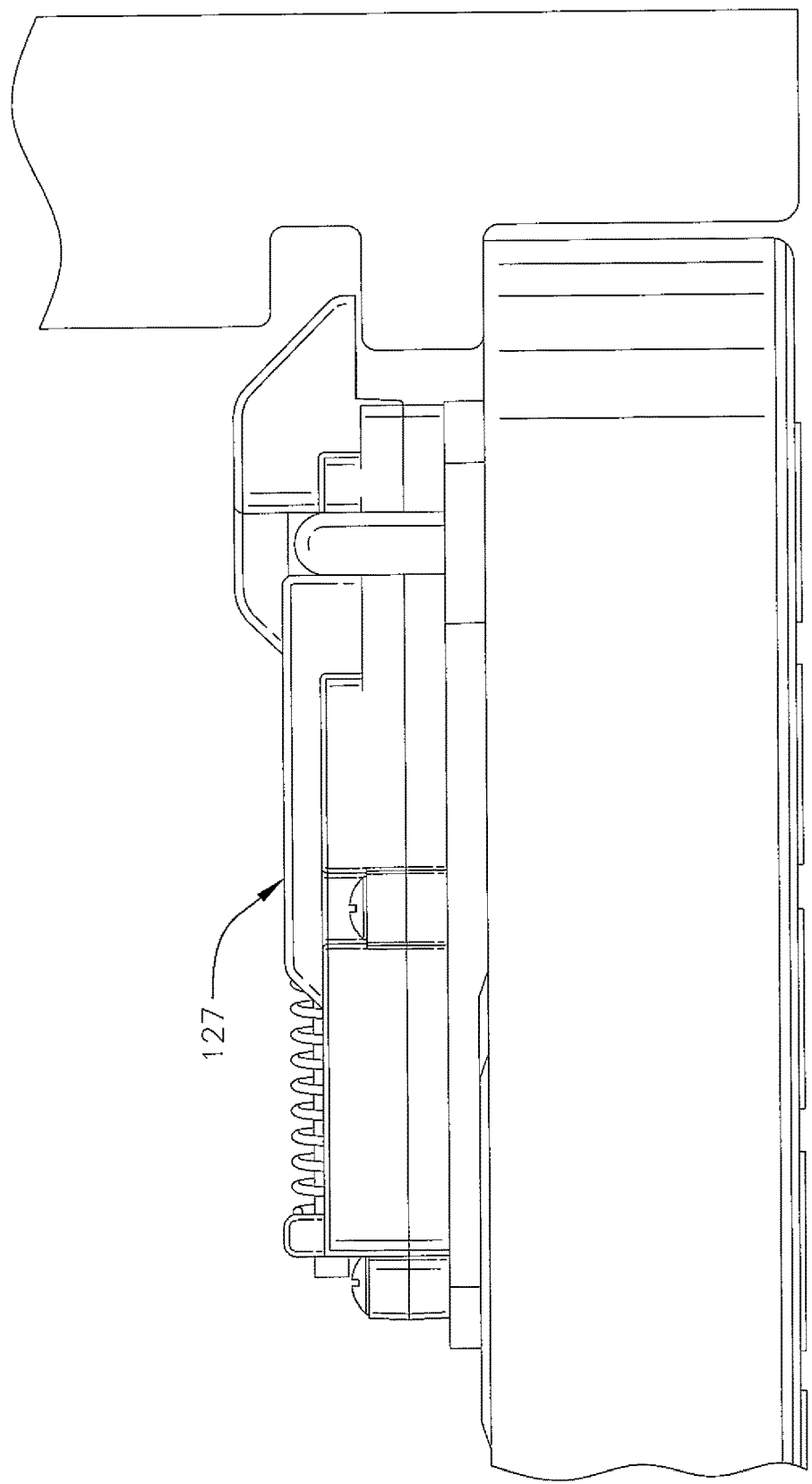
FIG. 17 is a detail view of a self-latching attachment mechanism for the lid.

Other types of fastening mechanisms can be utilized in addition to the L-bolt construction as identified in Applicant's U.S. Pat. No. 7,547,051, the contents of which are incorporated herein by reference in its entirety. Such as, for example, the lid could utilize a self-latching and locking assembly 127 for attachment of the lid to the vault as shown in FIG. 17 and illustrated in detail in Applicant's U.S. Pat. No. 8,220,298, the contents of which are incorporated herein by reference. Any unused holes 112, 114 not utilized for a particular attachment system can be closed with a removable plug 130 (FIG. 14) which at any time could be removed for the incorporation of a different securing option.

Figure 18:
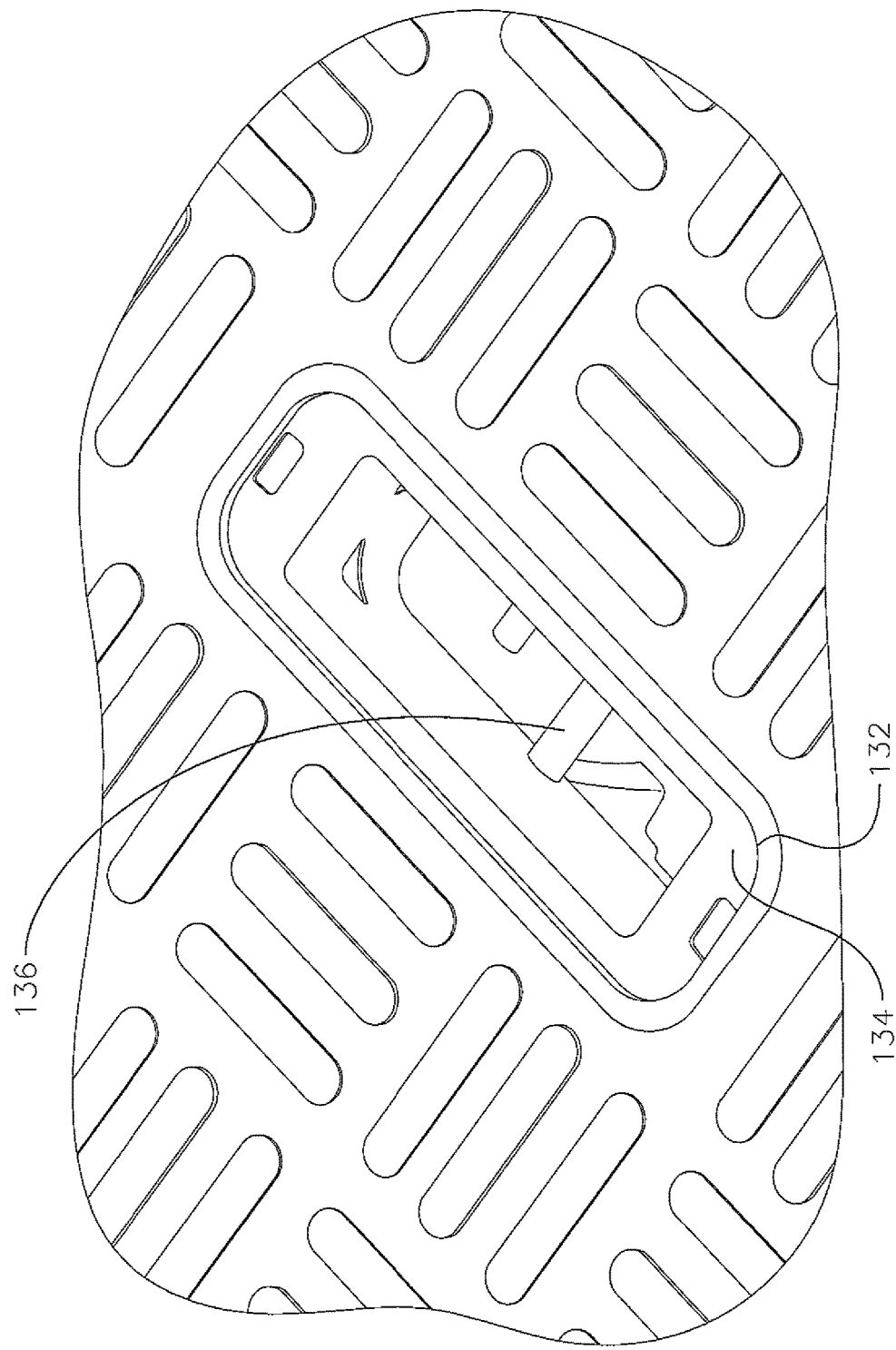
FIG. 18 is a detail view of the pick hole retaining cup of the lid.

As shown in FIG. 1 the lid includes a pick hole 132 for lifting the lid off of the vault. As shown in FIG. 18 a pick hole retaining cup 134 (also shown in FIG. 8) is positioned within the pick hole 132 which has a rod 136 positioned in a recess across the opening which can be engaged by a hook to lift the lid off of the vault. As shown in FIG. 14 the lid includes a pick hole cap 138 to prevent debris from collecting within the pick hole during use. Further specifics and features of the pick hole retaining cup for lifting the lid off of the vault is illustrated in Applicant's U.S. Pat. No. 8,708,183, the entire contents of which are incorporated herein by reference.

Figure 19:
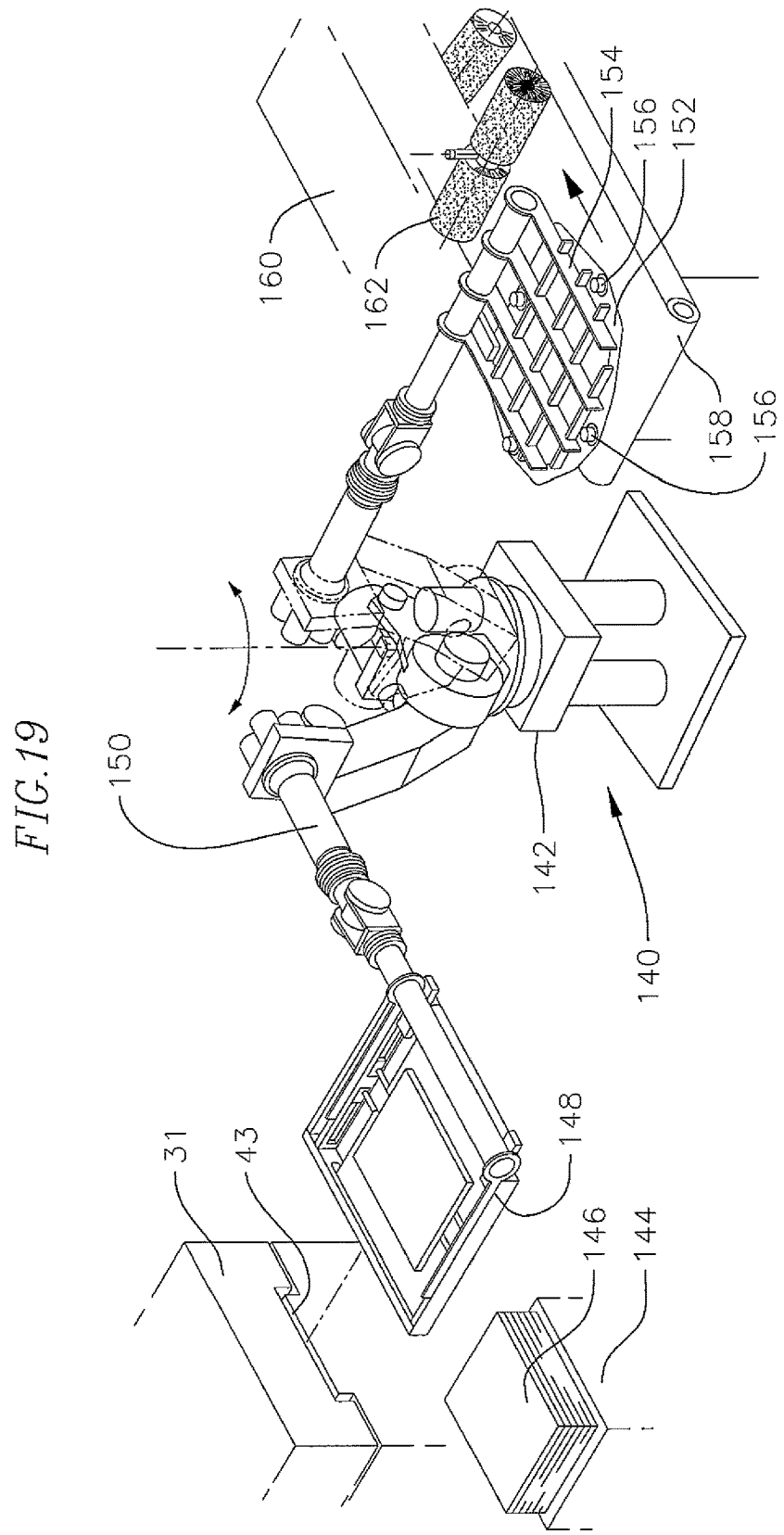
FIG. 19 is a schematic illustration of an automated manufacturing process.

As shown in FIG. 19, the molding and machining operations can be automated through the use of robotics 140. A robot 142 having a programmable logic controller would move from a neutral position to a charge loading station 144 where an operator would load a charge pattern 146 onto a loader 148 positioned on an end of an arm 150 of the robot. The programmable logic controller of the robot then moves the loader to the neutral position facing the mold press 31. The robot waits in the neutral position until the mold press opens and the controller makes sure the parts are clear and the ejection apparatus of the mold is retracted. The robot then moves to the open press and positions the charge loader 148 into the cavity 43 of the mold 31. The controller activates the loader dropping the charge into the mold cavity and retracts the loader from the mold.

Upon completion of the molding process and ejection of the molded cover from the mold, the robot includes a retractor 152 comprising a plate 154 and series of suction cups 156. The controller opens the press at the correct cycle time and activates the cover ejection mechanism wherein the robot positions the retractor 152 over the molded cover so that the suction cups 156 can engage the cover and move the molded cover to a conveyor system 158 and releases the cover onto the conveyor system. The conveyor system then delivers the molded cover to a machining station 160 which includes a plurality of rotating brushes 162 to deburr the molded cover. The machining station also includes drilling holes for the vault attachment mechanisms.

Final assembly of the cover includes placing the pick hole rod in the recess of the pick hole cup and securing the cup and cap to the lid, securing the identification marker to the lid, securing the L-bolt, through bolt or self-latching mechanism along with the retaining flange and plugging the holes with caps for the attachment mechanisms not used.

Although the invention has been described and illustrated with respect to various embodiments herein, it is to be understood that changes and modifications can be made therein which are within the full intended scope of the invention as hereinafter claimed.

What is claimed is:

1. A method of manufacturing a fiber reinforced polymer material lid for an utility vault comprising the steps of:
   mixing an unsaturated polyester thermosetting material into a resin paste;
   compounding the paste into a fiber reinforced composite material sheet;
   maturing the compounded fiber reinforced composite material sheet;
   cutting the matured compound sheet into a charge pattern;
   molding the charge pattern in a mold cavity of a heated mold under pressure to form the lid; and
   cooling and machining the lid,
   wherein molding the charge pattern in the mold cavity includes forming a textured surface on an upper surface of the lid by having a surface of the mold cavity have a plurality of protrusions which push individual fibers of the fiber reinforced composite sheet away from the upper surface to create a resin rich layer above the individual fibers, and
   wherein molding the charge pattern in the mold cavity further includes optionally forming a series of bosses of varying heights to create a gripping surface.

2. The method of claim 1 wherein the mixing step comprises combining polyester resin, polystyrene, a catalyst, a UV inhibitor, a fiber wetting additive, a mold release agent and an inorganic or mineral filler.

3. The method of claim 2 further comprising adding a thickener and a color pigment.

4. The method of claim 1 wherein the compounding step includes:
   transferring the resin paste to a first doctor box and a second doctor box;
   depositing a first layer of resin paste from the first doctor box onto a first carrier film;
   depositing reinforcing fibers onto the first layer of resin paste on the first carrier film;
   depositing a second layer of resin paste from the second doctor box onto a second carrier film;
   layering the second layer of resin paste on top of the first layer of resin paste containing the reinforcing fibers; and
   compacting the first layer of resin paste, reinforcing fibers and second layer of resin paste to form a sheet.

5. The method of claim 1 wherein the maturing step comprises chemically thickening the sheet.

6. The method of claim 1 wherein the molding step comprises the steps of:
   compressing the charge pattern in the mold;
   transforming the charge pattern from a resin paste into a viscoelastic liquid;
   filling the mold cavity with the viscoelastic liquid;
   evacuating air from the mold cavity; and curing the low viscosity liquid in the mold cavity under heat and low pressure.

7. The method of claim 1 wherein the resin matrix paste comprises about 10% to about 40% polyester resin.

8. The method of claim 1 wherein the resin matrix paste comprises about 5% to about 30% polystyrene.

9. The method of claim 1 wherein the resin matrix paste comprises about 15% to about 50% inorganic or mineral filler.

10. The method of claim 1 wherein the compounded fiber reinforced composite material comprises about 5% to about 60% fiber glass.

11. The method of claim 1 further comprising the step of automatically loading the charge pattern into the mold cavity and removing the molded lid and moving the molded lid to a machining station.

12. The method of claim 11 wherein the step of automatically loading the charge pattern and removing the molded lid and moving the molded lid is by a robot.

13. The method of claim 1 wherein forming a textured surface on an upper surface of the lid includes a change of depth into the upper surface.

14. The method of claim 13 wherein the change of depth into the upper surface is of different depths.

* * * * *